(12) United States Patent
Frigoli et al.

(10) Patent No.: US 7,416,682 B2
(45) Date of Patent: Aug. 26, 2008

(54) PHOTOCHROMIC LIQUID CRYSTALS

(75) Inventors: Michael Frigoli, Hull (GB); Georg Mehl, Hull (GB)

(73) Assignee: Chi Mei Optoelectronics Corporation, Tainan (TW)

( * ) Notice: Subject to any disclaimer, the term of this patent is extended or adjusted under 35 U.S.C. 154(b) by 687 days.

(21) Appl. No.: 10/519,148

(22) PCT Filed: Jun. 26, 2003

(86) PCT No.: PCT/GB03/02720

§ 371 (c)(1),
(2), (4) Date: Dec. 27, 2004

(87) PCT Pub. No.: WO2004/003107

PCT Pub. Date: Jan. 8, 2004

(65) Prior Publication Data

US 2005/0258396 A1 Nov. 24, 2005

(30) Foreign Application Priority Data

Jun. 28, 2002 (GB) .................. 0214989.6

(51) Int. Cl.
*C09K 19/00* (2006.01)
*C09K 19/52* (2006.01)
*G03F 1/03* (2006.01)

(52) U.S. Cl. .............. 252/299.1; 252/299.2; 252/299.3; 252/299.4; 252/299.5; 252/299.6; 252/299.7; 428/1.1; 428/1.2; 430/20; 430/270.1; 349/176

(58) Field of Classification Search ... 252/299.1–299.7; 430/20, 270.1; 428/1.1, 1.2; 349/176
See application file for complete search history.

(56) References Cited

U.S. PATENT DOCUMENTS

| | | | |
|---|---|---|---|
| 5,496,670 A | 3/1996 | Hvilsted et al. | |
| 5,679,792 A | 10/1997 | Escher et al. | |
| 6,359,150 B1 | 3/2002 | Fukudome et al. | |
| 2002/0007072 A1 | 1/2002 | Irie | |
| 2002/0034705 A1 | 3/2002 | Irie et al. | |
| 2002/0142248 A1 | 10/2002 | Dubois et al. | |

FOREIGN PATENT DOCUMENTS

| | | |
|---|---|---|
| DE | 100 39 903 A | 2/2002 |
| EP | 1 167 487 A | 1/2002 |
| JP | 06-049443 A | 2/1994 |
| JP | 08 143564 A | 6/1996 |
| JP | 09 061609 A | 3/1997 |
| JP | 09 241254 A | 9/1997 |
| JP | 10 251630 A | 9/1998 |
| JP | 11-071368 A | 3/1999 |
| JP | 2000-72768 A | 3/2000 |
| JP | 2000-87024 A | 3/2000 |
| JP | 2000 344693 A | 12/2000 |
| JP | 2001 049244 A | 2/2001 |
| JP | 2002 069439 A | 3/2002 |
| JP | 2002 082414 A | 3/2002 |
| JP | 2002 293784 A | 10/2002 |
| JP | 2002 302669 A | 10/2002 |
| JP | 2002 309244 A | 10/2002 |
| JP | WO 02 102923 A | 12/2002 |
| WO | WO 02 21523 A | 3/2002 |

OTHER PUBLICATIONS

Uchida et al, Chemistry Letters 2000, 6, pp. 654-655, "An optically active diarylethene having cholesterol units: a dopant for photoswitching of liquid crystal phases".

*Primary Examiner*—Geraldina Visconti
(74) *Attorney, Agent, or Firm*—Fish & Richardson P.C.

(57) ABSTRACT

The invention relates to novel photochromic liquid crystal materials which may be used in various electro-optic devices including liquid crystal devices. The materials can be converted into another form on irradiation by light which may make it feasible for them to be addressed by light in electro-optic devices. The materials are based on 5-membered heterocycles.

11 Claims, 14 Drawing Sheets

PHOTOCHROMIC LIQUID CRYSTALS

Figure 1:
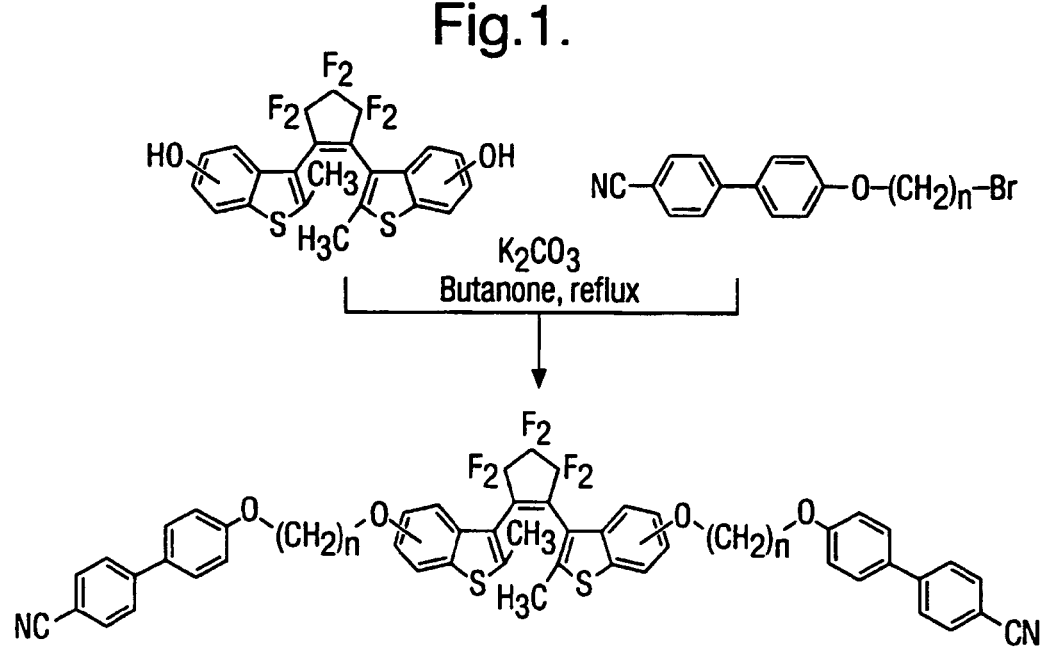
Figure 1:
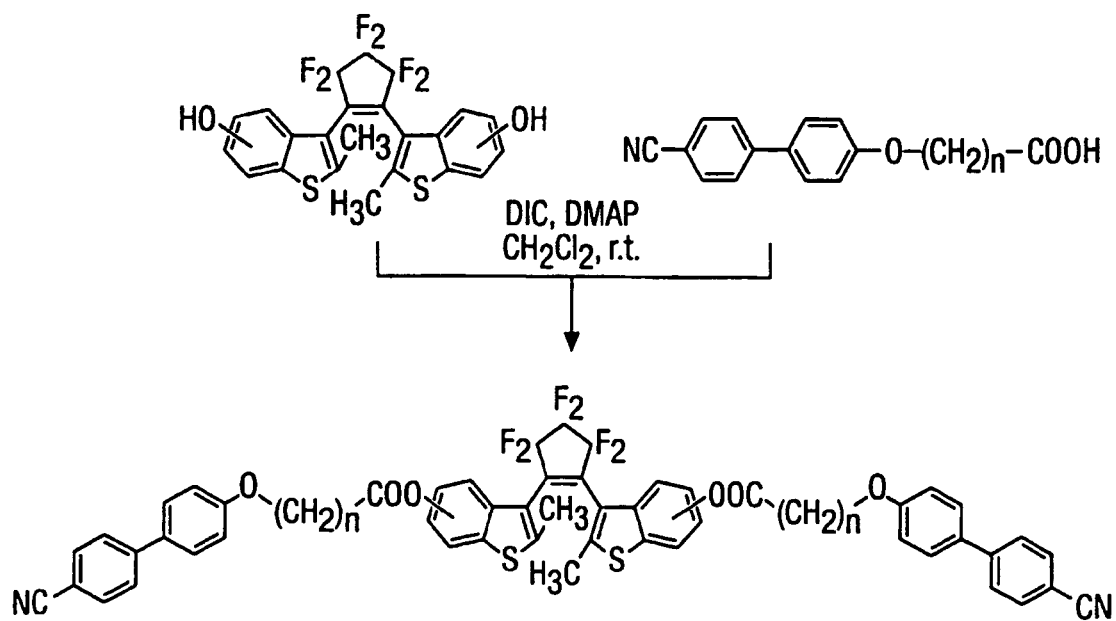
Figure 2:
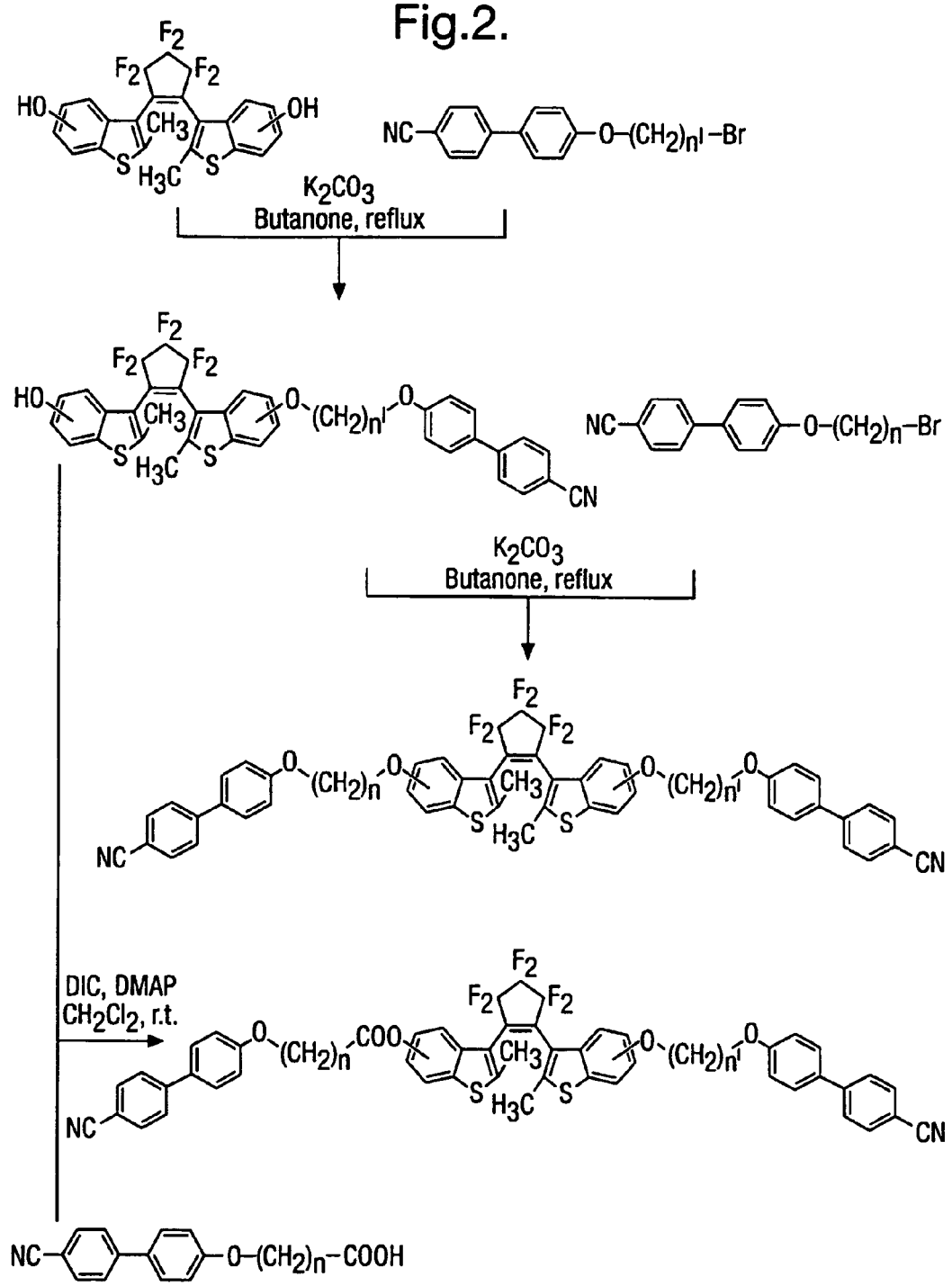
Figure 3:
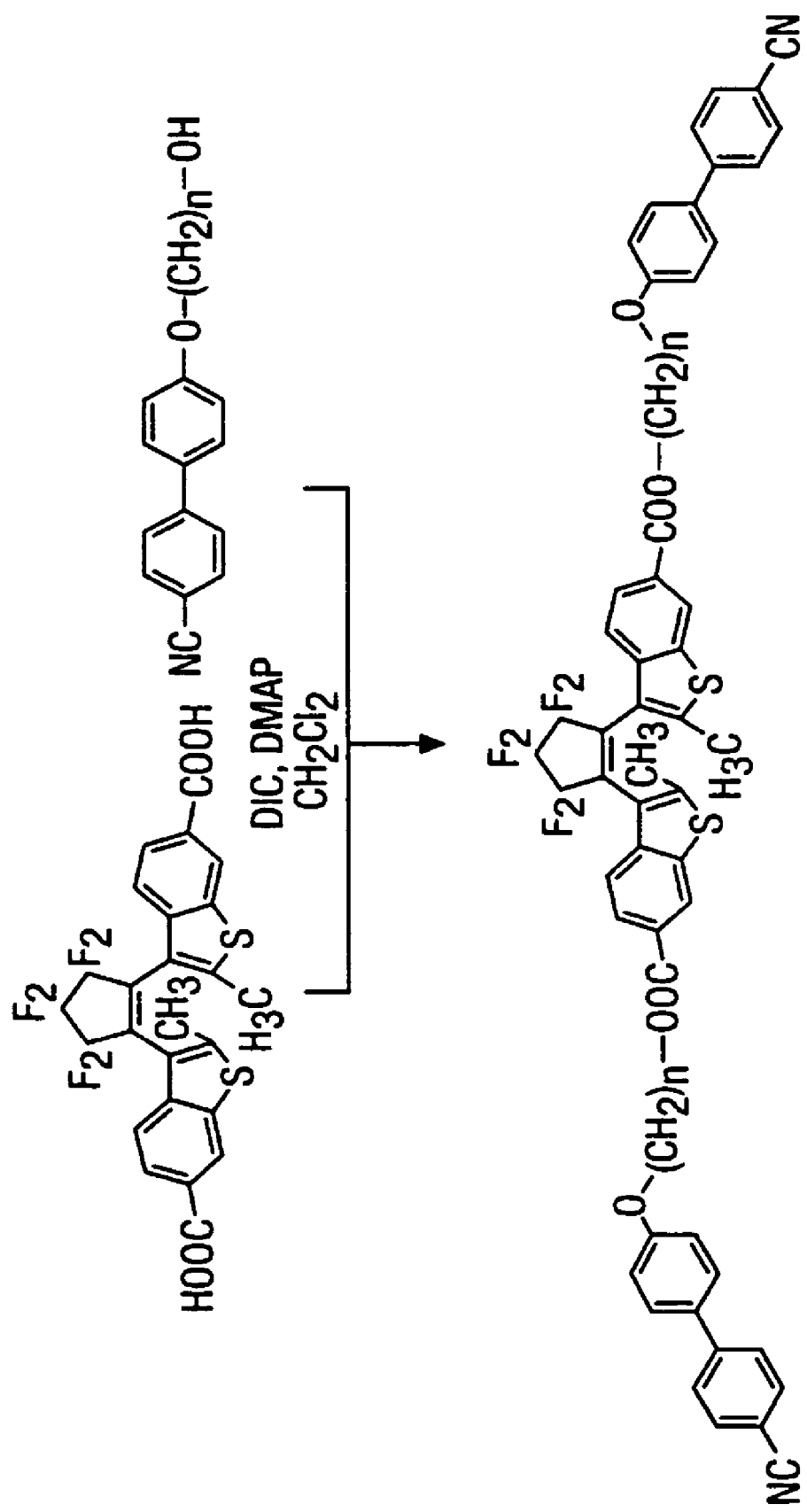
Figure 4:
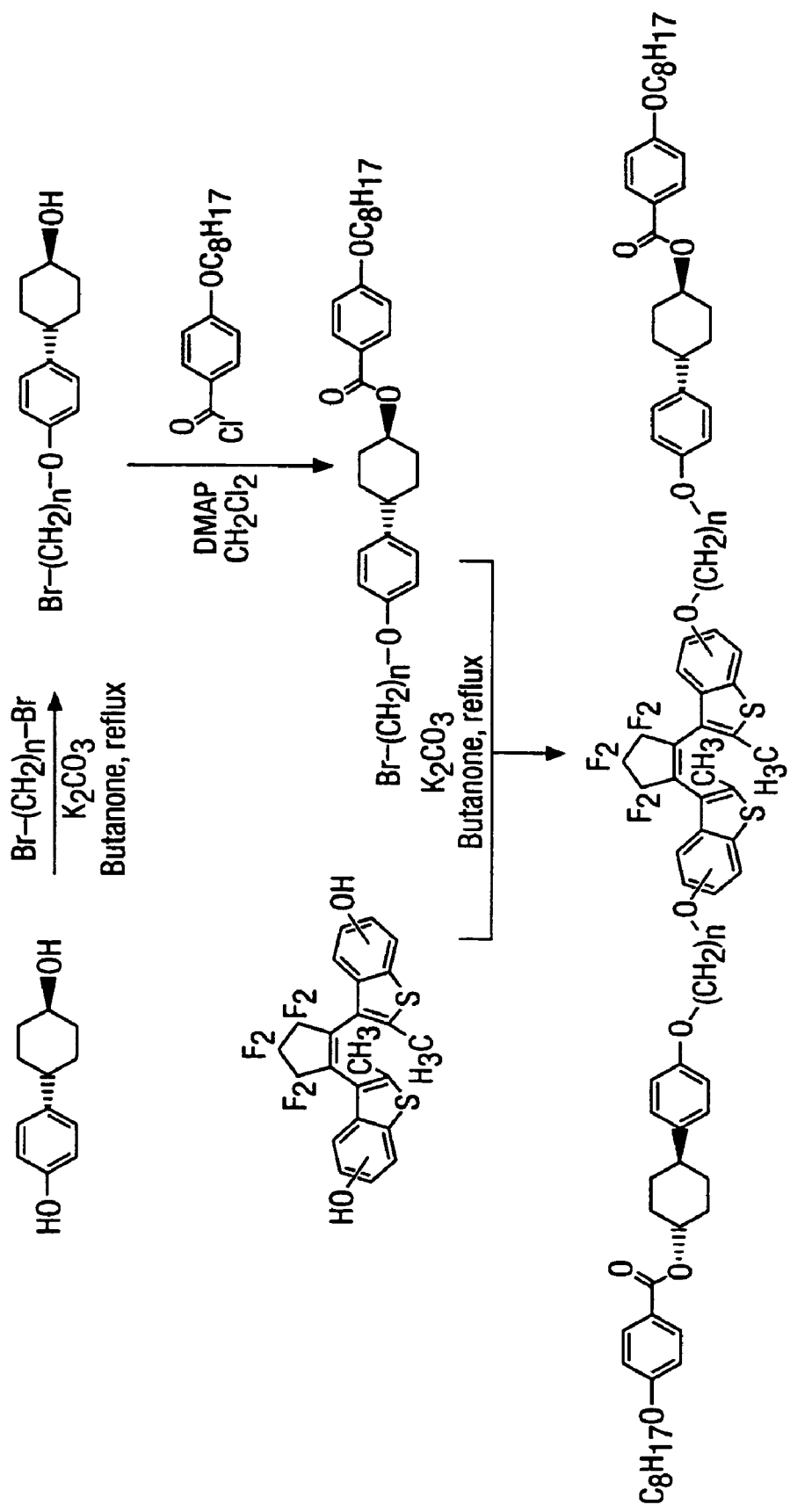
Figure 5:
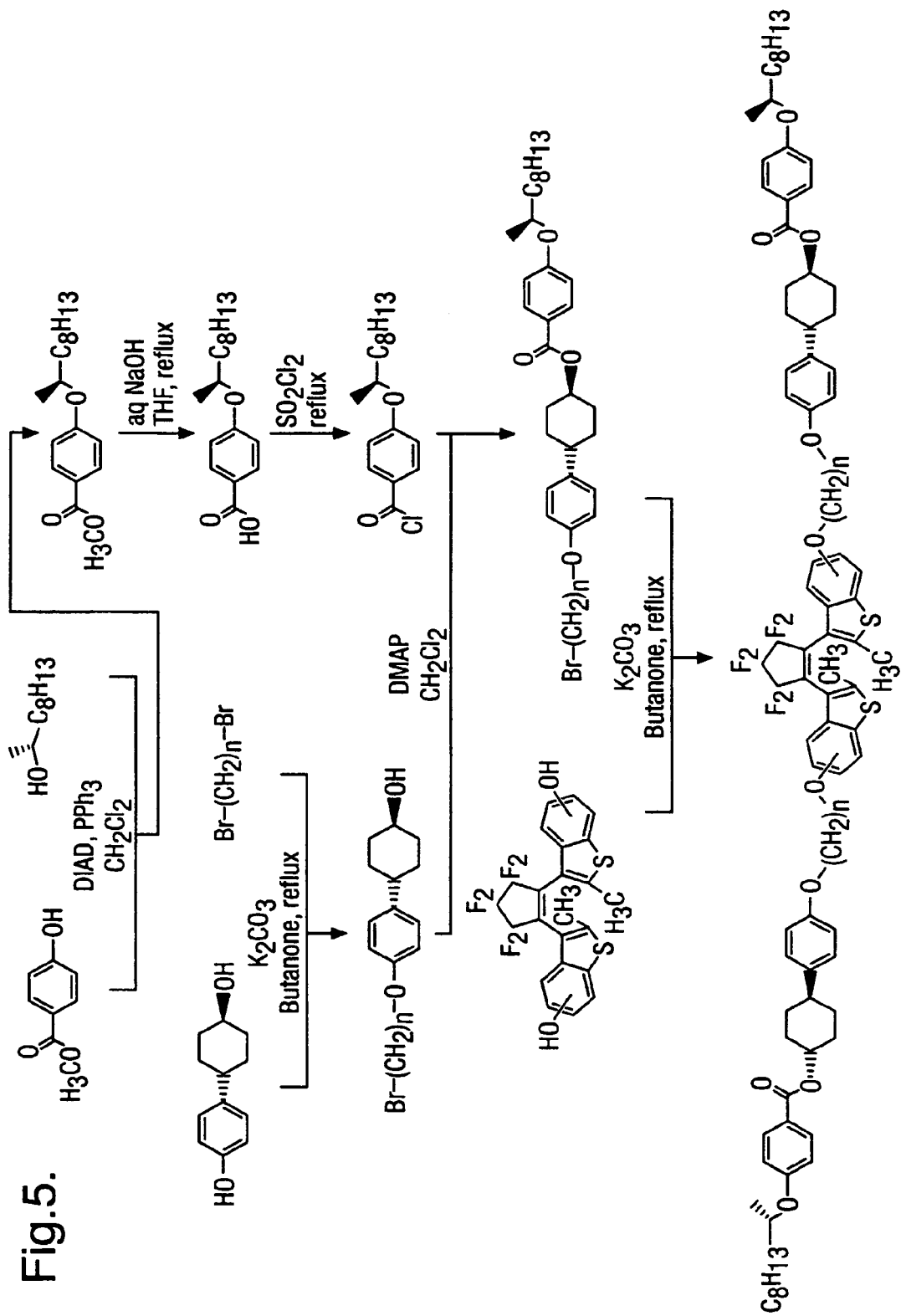
Figure 6:
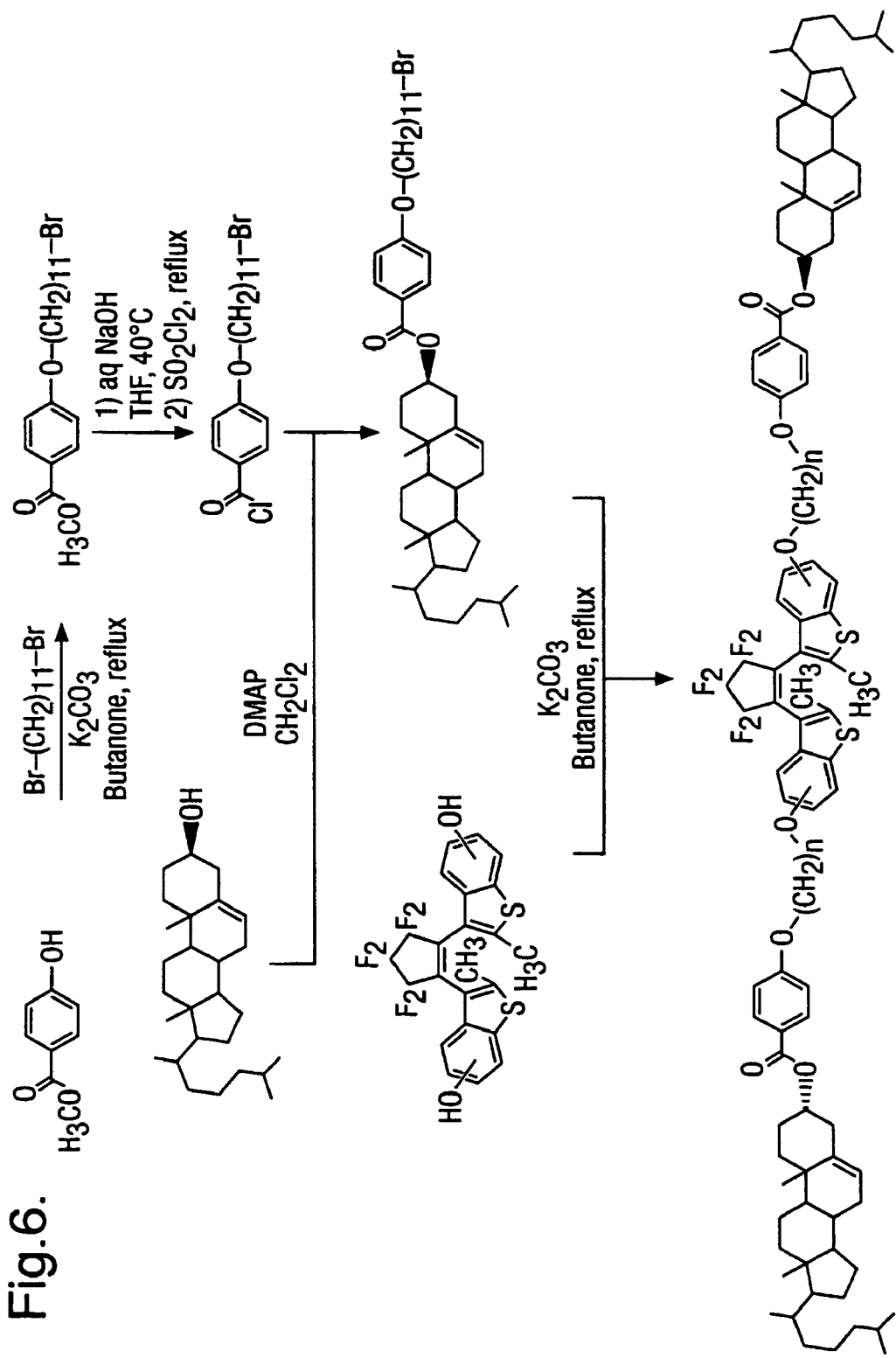
Figure 7:
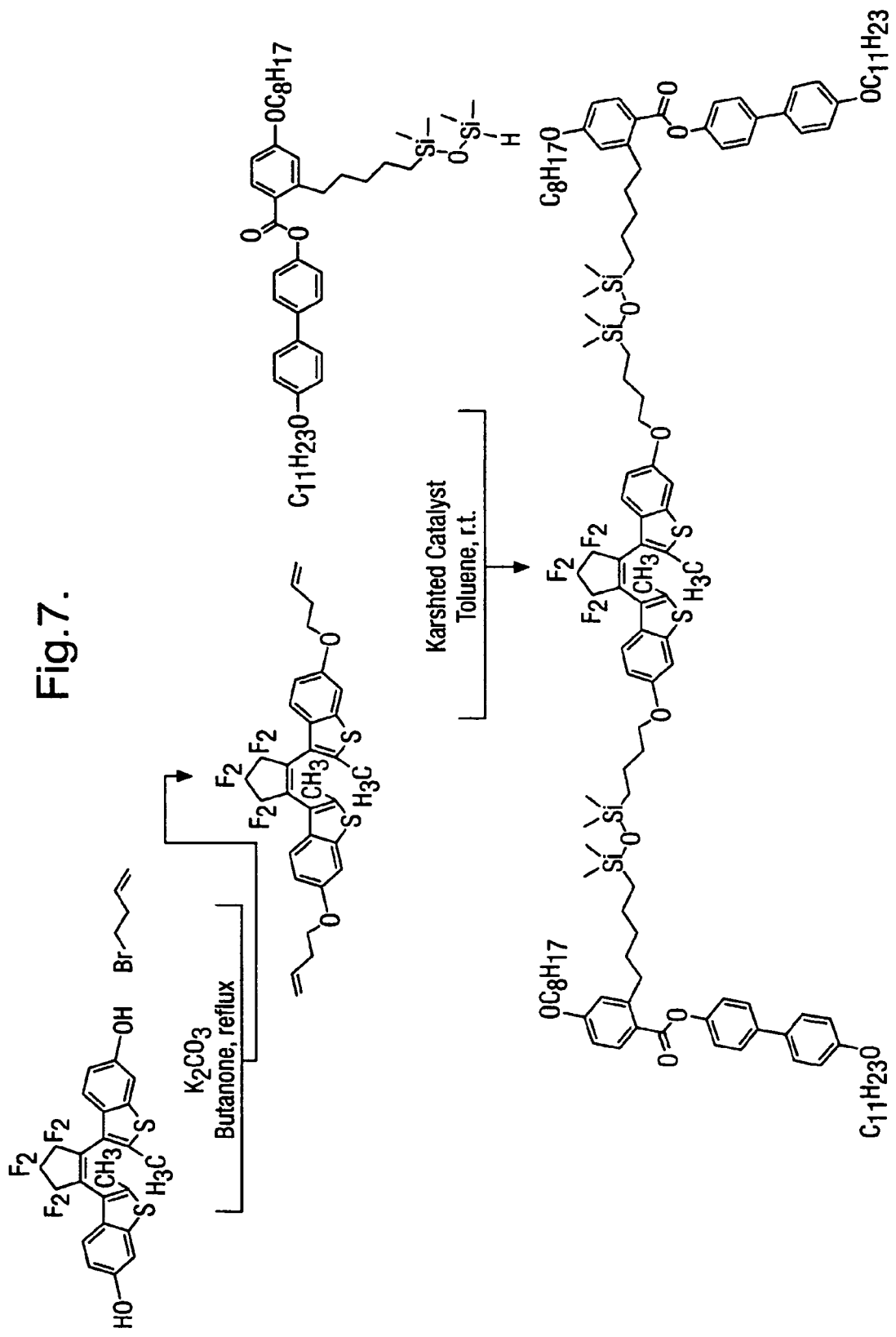
Figure 8:
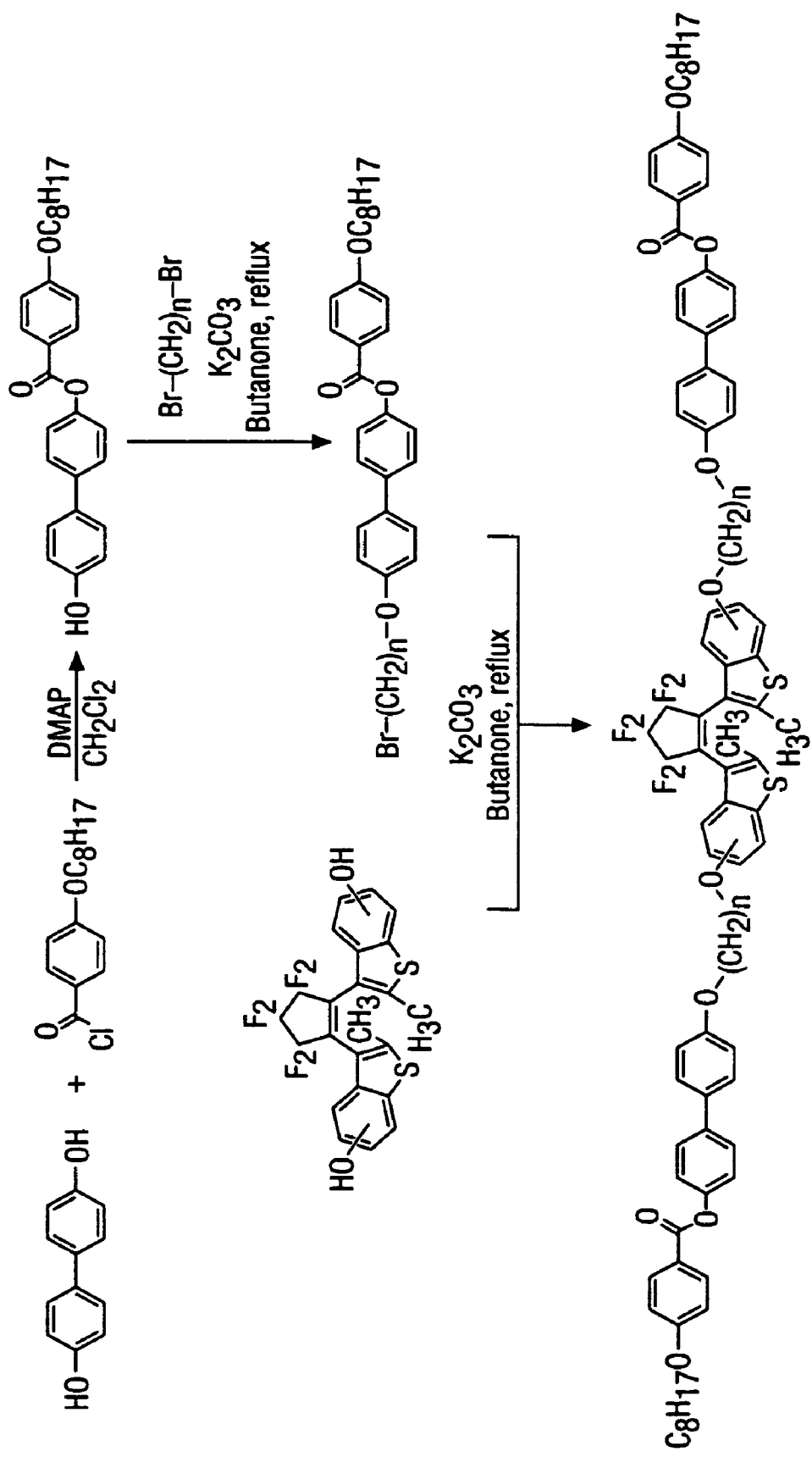
Figure 9:
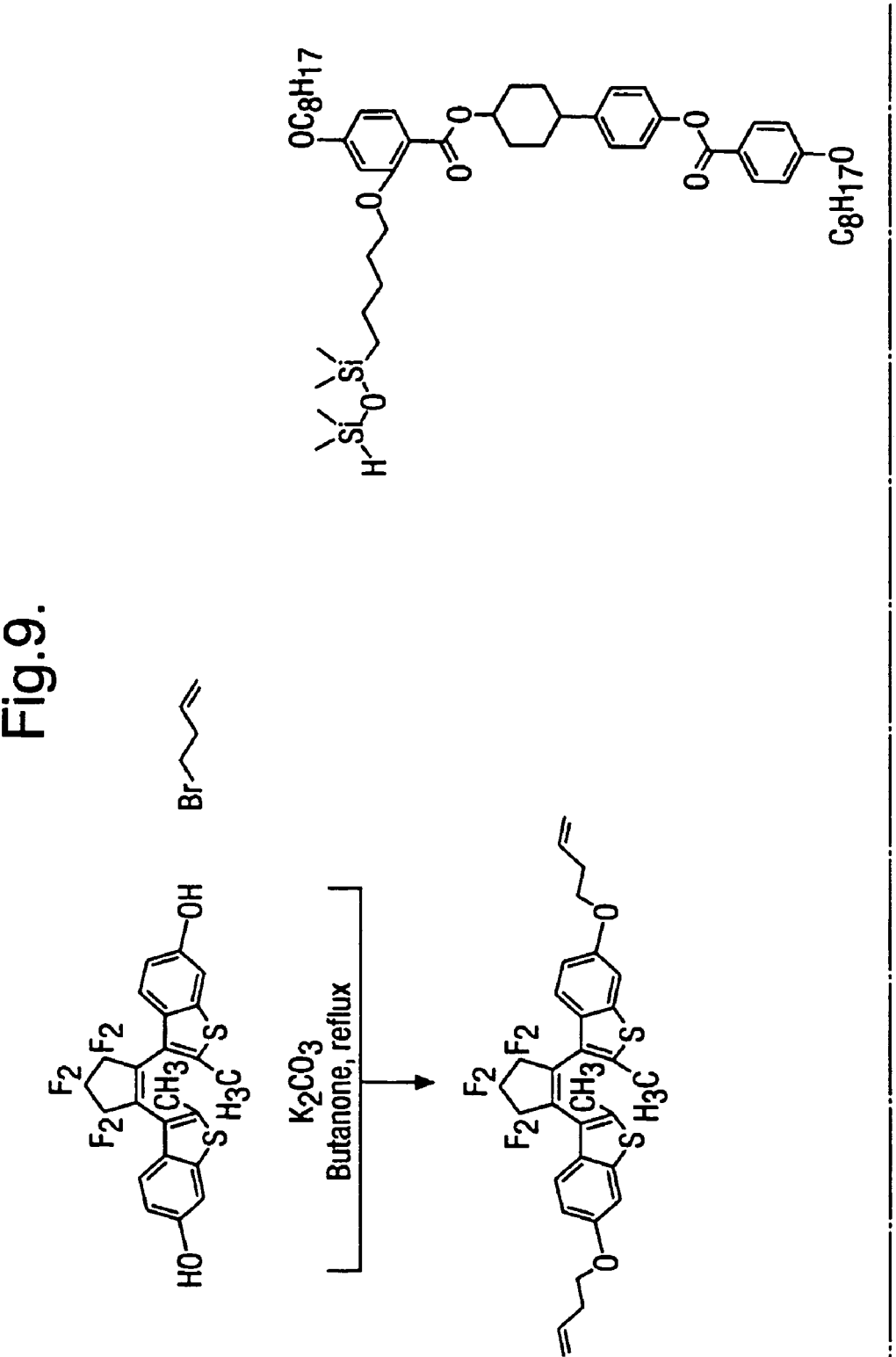
Figure 9:
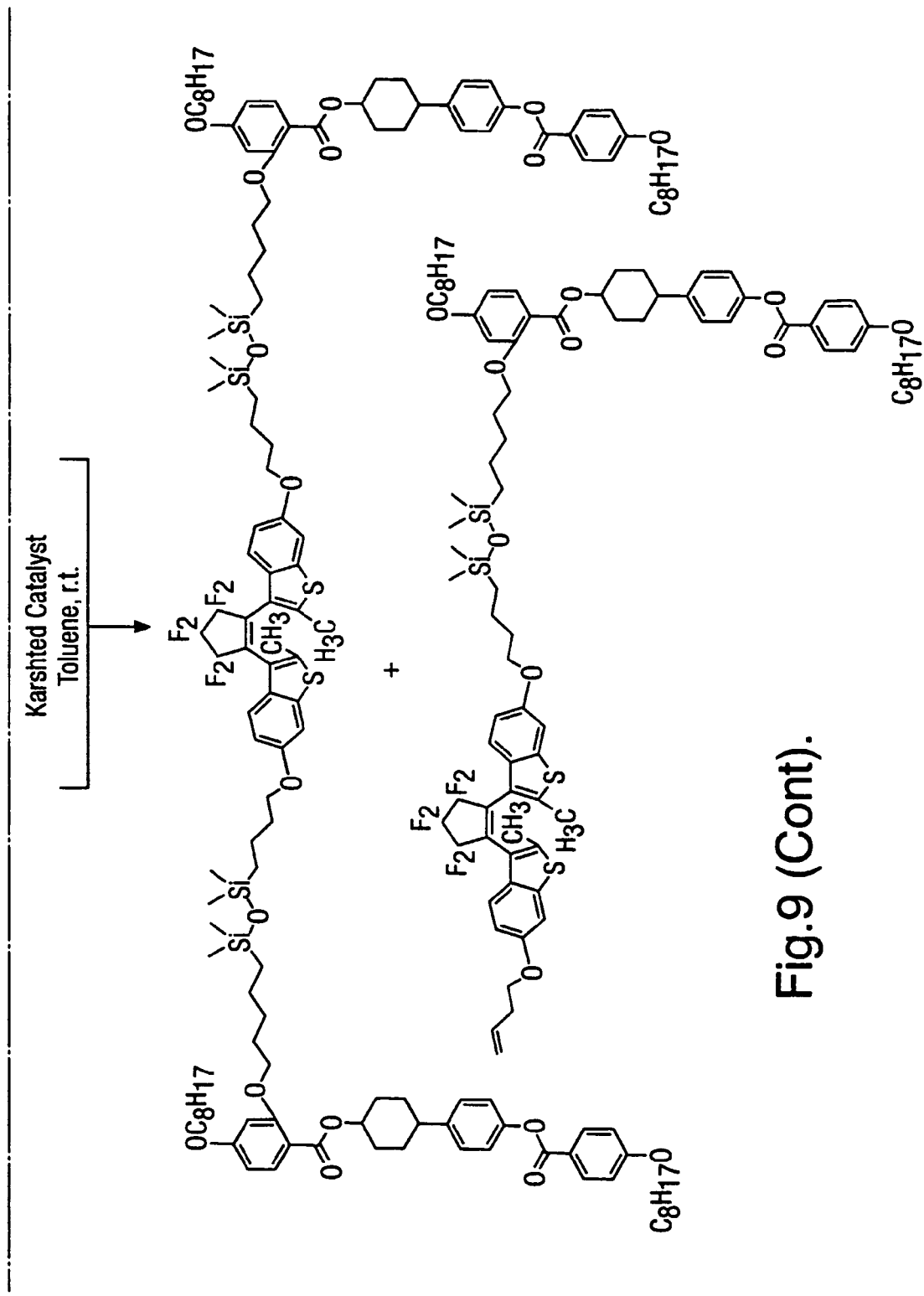
Figure 10:
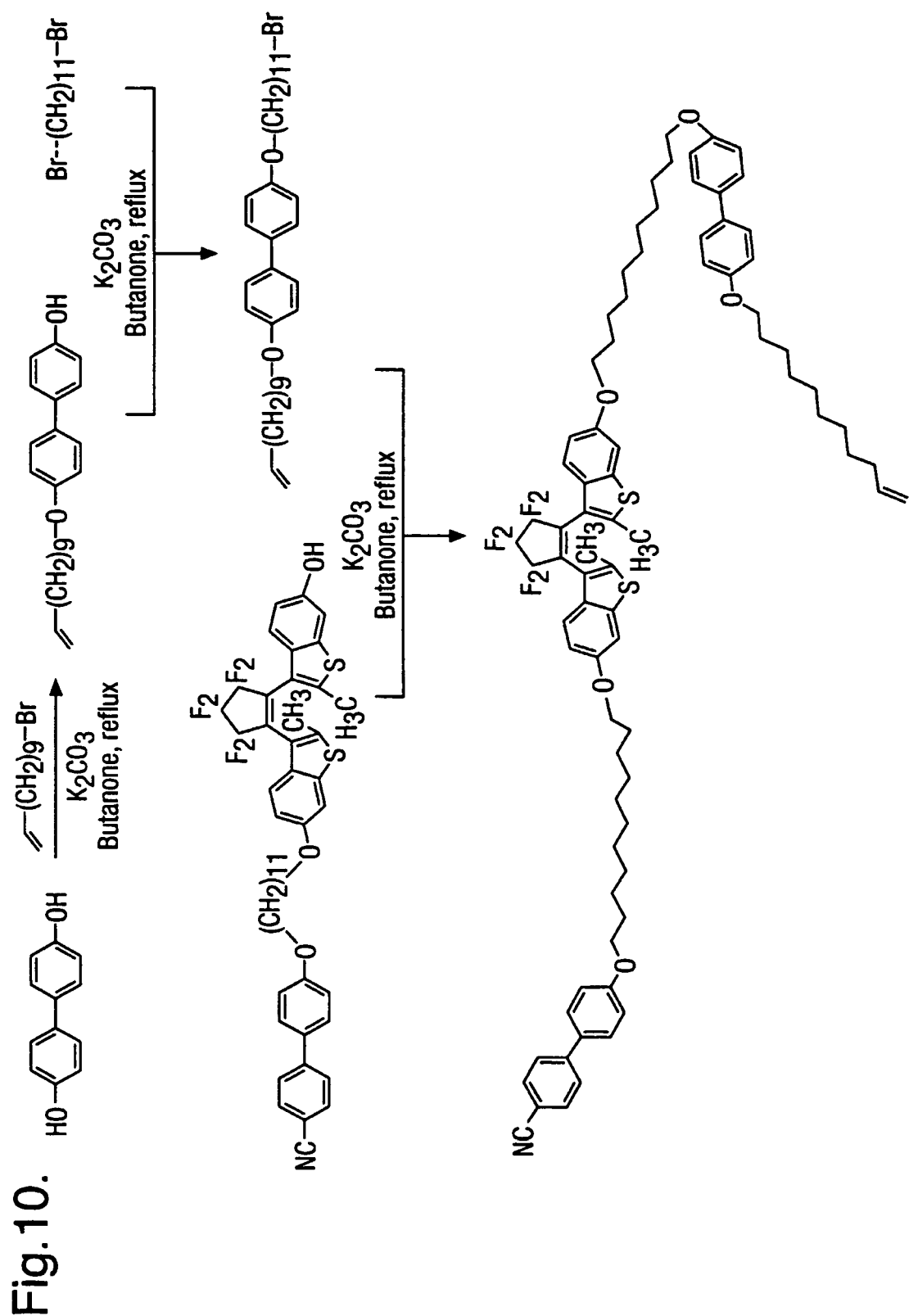

This application is the U.S. national phase of international application PCT/GB2003/002720 filed 26 Jun. 2003 which designated the U.S. and claims benefit of GB 021489.6, dated 28 Jun. 2002, the entire content of which is hereby incorporated by reference.

This invention relates to photochromic liquid crystals and their use in mixtures and devices.

A photochromic material is one whose transmittance varies with the intensity of light incident upon it, wherein the transmittance is the ratio of energy transmitted by a body to that incident on it. Photochromic materials may undergo reversible chemical transformations under the influence of electromagnetic radiation with the states possessing different absorption maxima. More generally photochromic materials may be thought of as materials which change shape, electronic structure and colour preferably in a controlled manner upon irradiation with light of selected wavelengths.

The term "liquid crystals" is well known. It refers to compounds which, as a result of their structure, will align themselves in a similar orientation, preferably at working temperatures, for example of from −40 to 200° C. These materials are useful in various devices, in particular liquid crystal display devices or LCDs.

Liquid crystals can exist in various phases. In essence there are three different classes of liquid crystalline material, each possessing a characteristic molecular arrangement. These classes are nematic, chiral nematic (cholesteric) and smectic.

Broadly speaking, the molecules of nematic compounds will align themselves in a particular orientation in a bulk material. Smectic materials, in addition to being orientated in a similar way, will align themselves closely in layers.

A wide range of smectic phases exists, for example smectic A and smectic C. In the former, the molecules are aligned perpendicularly to a base or support, whilst in the latter, molecules may be inclined to the support. Some liquid crystal materials possess a number of liquid crystal phases on varying the temperature. Others have just one phase. For example, a liquid crystal material may show the following phases on being cooled from the isotropic phase:—isotropic—nematic—smectic A—smectic C—solid. If a material is described as being smectic A then it is generally taken to mean that the material possesses a smectic A phase over a useful working temperature range.

Such materials are useful, in particular in display devices where their ability to align themselves and to change their alignment under the influence of voltage, is used to impact on the path of polarised light, thus giving rise to liquid crystal displays. These are widely used in devices such as watches, calculators, display boards or hoardings, computer screens, in particular laptop computer screens etc. The properties of the compounds which impact on the speed with which the compounds respond to changes in voltage include molecule size, viscosity ($\Delta n$), dipole moments ($\Delta \epsilon$), conductivity etc.

A typical liquid crystal device comprises a layer of liquid crystal material (typically a mixture) sandwiched between two cell walls. On the inner surfaces of the cell walls are electrode structures and on the inner surface of the electrode structures is a so called alignment layer. This alignment layer serves to align the liquid crystal material in a particular manner such that the switching characteristic of the device may be optimised. There are various types of methods of providing alignment layers including rubbing the surface in a particular direction, typically with a cloth. Alternatively there are so called non contact alignment layers wherein a layer of material is deposited on to the inner electrode surface(s) which has the effect of imparting a particular alignment characteristic on to the liquid crystal material. These alignment techniques are well known to those skilled in the art and there is a continued effort in developing improved methods of alignment.

There is also a continued need for alternative liquid crystal materials which show improved properties in the bulk liquid crystal layer.

The current inventors have combined the properties of photochromic and liquid crystal materials in order to provide what is believed to be a new class of materials which are of interest for their bulk liquid crystal properties, their aligning properties and also that they provide for devices which may be light addressed in addition to more conventional addressing means.

According to a first aspect of this invention the following materials of Formula I and Formula Ib are provided:

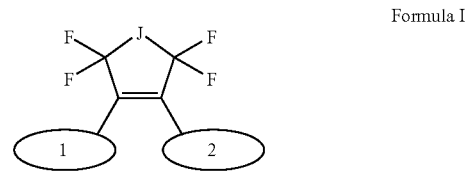

Formula I

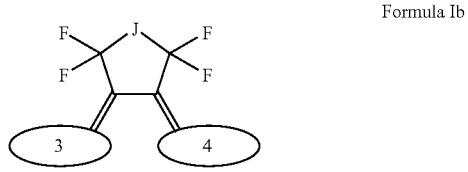

Formula Ib

Wherein the

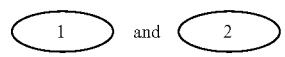

groups are chosen respectively from the following:

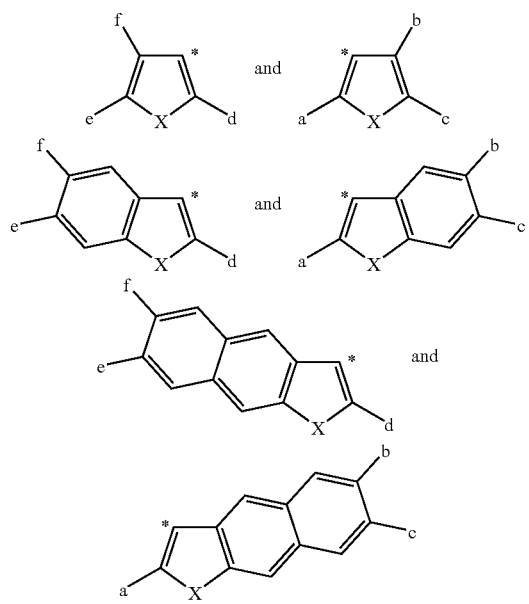

-continued
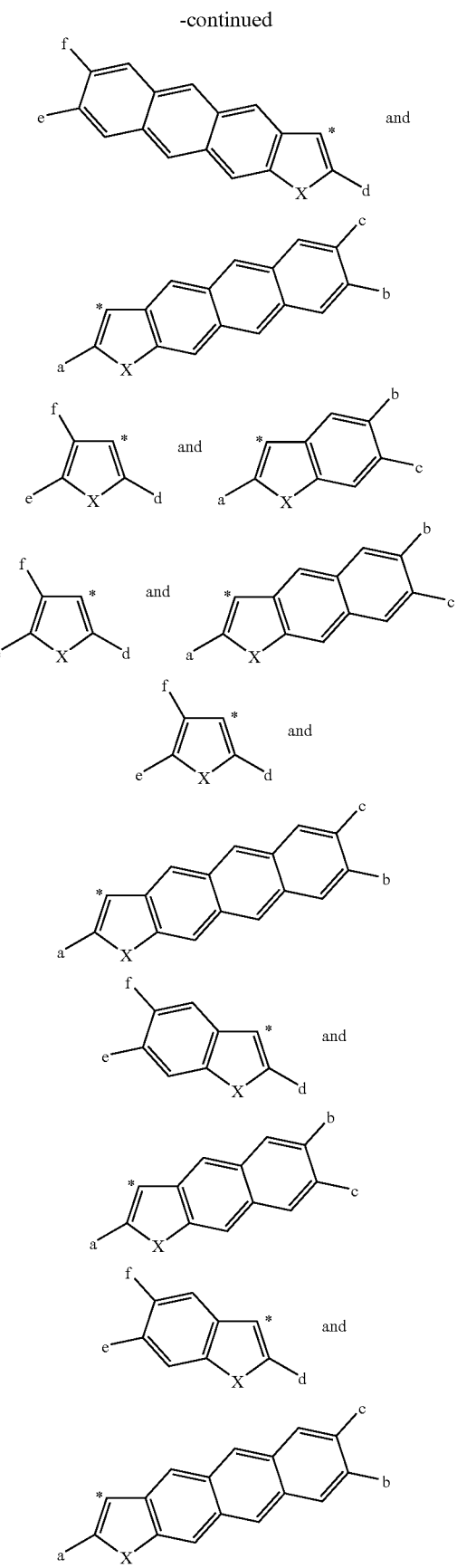
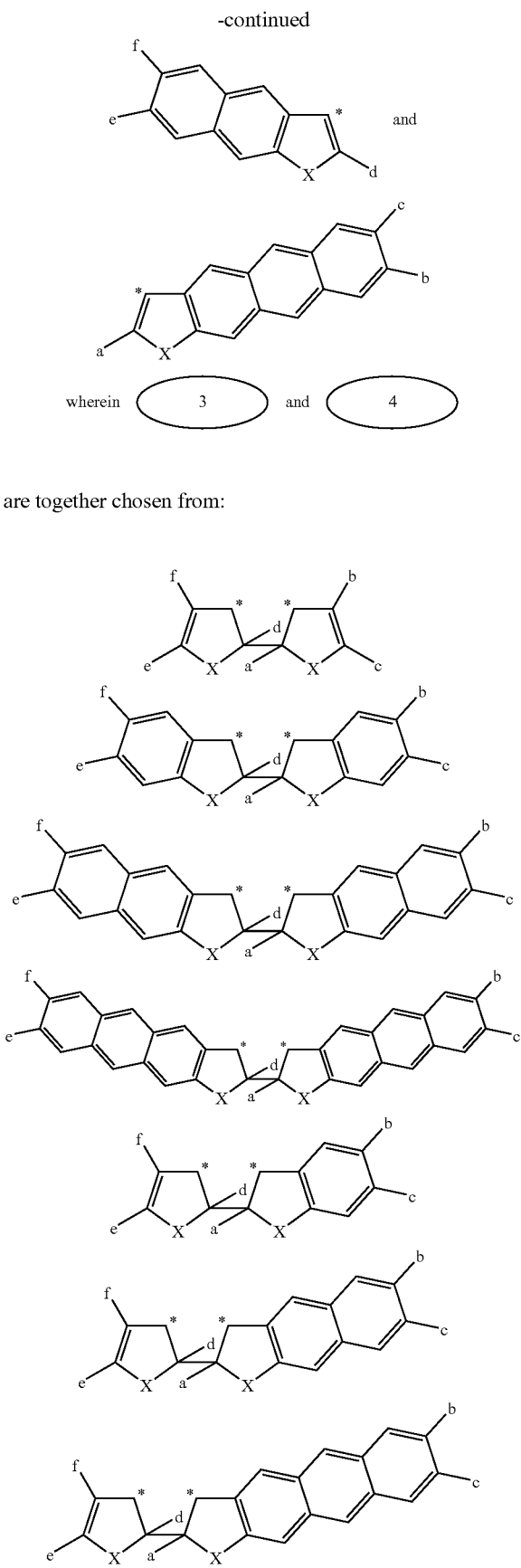
wherein ( 3 ) and ( 4 ) are together chosen from:

-continued

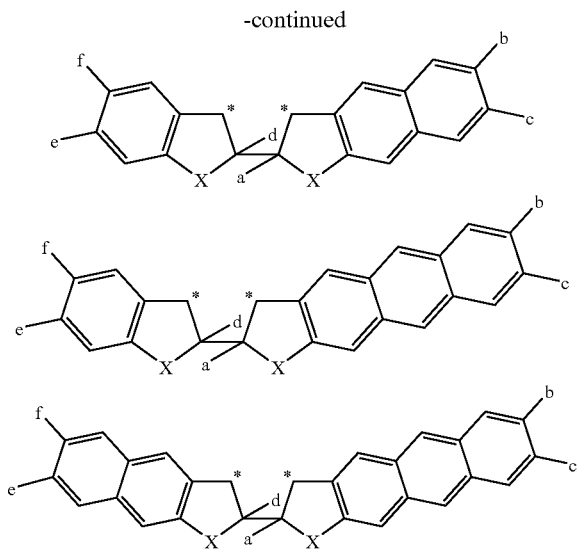

* indicates the point of attachment to Formula I or Formula Ib;

the phenyl groups in

may independently of each other be replaced by pyridine and pyrimidine groups;

wherein X is selected from S, O, NH, Se, $CH_2$, P;

wherein J is selected from $CF_2$, $CH_2$, CFH, $NR^9$ wherein R9 is selected from H, C1-40 branched or straight chain alkyl wherein one or more of the $CH_2$ groups may be replaced by O, CH and the terminal $CH_3$ group may be replaced by a $CH_2$ group or an SH, OH, COOH, CHO, $O_2CCHCH_2$ or $O_2CC(CH_3)CH_2$ group;

wherein a and d are independently selected from $CH_3$, $CF_3$, $CH_2CH_3$, $OCH_3$, $OCH_2CH_3$ or Formula II;

b, c, e and f are independently selected from H, Formula II or C1-40 branched or straight chain alkyl wherein one or more of the $CH_2$ groups may be replaced by O, CFH, $CF_2$, CH and the terminal $CH_3$ group may be replaced by a $CH_2$ group or an SH, OH, $CF_3$, COOH, CHO, $O_2CCHCH_2$ or $O_2CC(CH_3)CH_2$ group wherein Formula II is given by:

Formula II wherein Y is selected from O, —$CO_2$—, $O_2C$, S, $CH_2$, or a single bond;

Q is selected from $(CH_2)n$, n is 1-20 or $(CH_2)m$-[Si(L2)-O]q-Si(L2)-$(CH_2)p$- where m is 2-20, p is 2-20, q is 1-12 and the L groups are independently of each other selected from $CH_3$, $CF_3$, H;

Z is O or $CO_2$ or $O_2C$ or $CH_2$ or a single bond;

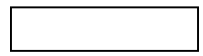

is a mesogenic group;

T is 1 or 2 or 3;

when T is 2 then Q may also be selected from $(CH_2)gN((CH_2)r)_2$, $(CH_2)gSi(CH_3)((CH_2)r)_2$, $(CH_2)gP((CH_2)r)_2$, $(CH_2)gGe(CH_3)((CH_2)r)_2$, wherein the values of g and r are independently selected from 1-20;

when T is 3 then Q may also be selected from $(CH_2)g'Si((CH_2)r')_3$, and $(CH_2)g'Ge((CH_2)r')_3$; wherein the values of g' and r' are independently selected from 1-20;

provided that at least one of a, b, c, d, e, f are selected from Formula II.

In the above Formula II the groups corresponding to Y would generally be referred to as connecting groups, the Q groups as spacers and the Z groups as connecting groups.

When T is 2 this indicates that there are two Z-mesogenic groups attached to Q and an H from the appropriate $CH_2$ group of Q has been replaced when the connectivity is to or via an alkylene group and similarly when T is 3 then 2H are replaced. If there is more than one Z-mesogenic group present i.e. T>1 then those Z-mesogenic groups are chosen independently.

Preferably the mesogenic group is given by the following Formula III:

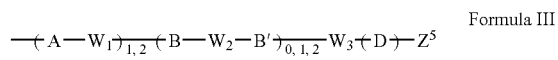

Formula III

A, B, B' D are selected from the following rings:

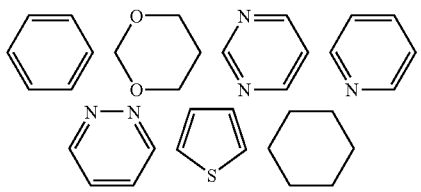

the above rings may be substituted with one or more of the following substituents in at least one of the available substitution positions: F, Cl, Br, $CH_3$, CN, OR, R and NCS where R is given by $C_{1-16}$ branched or straight chain alkyl, (preferably $C_{1-8}$ more preferably $C_{1-5}$); B' may also be selected from single bond;

$Z^5$ is selected from CN, F, Cl, $NO_2$, R, OR, $CO_2R$, $CF_3$, OOCR, NCS, SCN, where R=straight chain or branched chain alkyl and may include from 1-16 carbon atoms and including where one or more non-adjacent $CH_2$ groups may be substituted by CH(CN), $CH(CF_3)$, CH(Cl), $CH(CH_3)$ in chiral or non-chiral form and one or more non-adjacent $CH_2$ groups may be substituted by CH such that there is a double bond present and the terminal $CH_3$ group may be replaced by a $CH_2$ group;

provided that the total number of rings present is not greater than 4;

$W_1$ and $W_2$ and $W_3$ are independently selected from COO, OCO, single bond, $CH_2CH_2$, $CH_2O$, $OCH_2$, O, S, CH=CH, C≡C, $OCO(CH_2)_x$, $COO(CH_2)_x$ wherein $x$ is 1-4.

The connectivity of group Z to the mesogenic group of Formula III may be at any of the available carbon atom substitution positions on groups A, B, B', D.

Similarly the connectivity of the Z group to the mesogenic group in Formula II does not limit the nature of the point of attachment.

The mesogenic group or at least a part of the mesogenic group may also be given by the cholesteryl group and derivatives thereof. For example in Formula III the portion B—W$_2$—B'—W$_3$-D-Z$^5$ would be given by cholesteryl and derivatives thereof.

Preferably (independently):

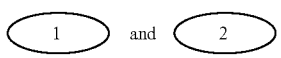

are chosen from

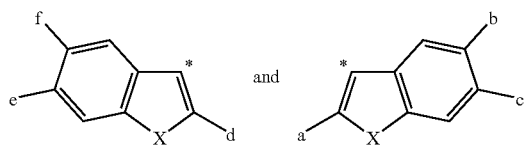

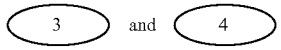

are chosen from

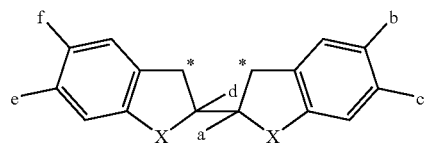

X is S;
J is CF2;
a and d are CH$_3$ or Formula II;
one of b and c and one of e and f are chosen from Formula II;
in Formula II Y is O, OCO, CO2;
for Q when selected from (CH2)n then n is 2-12, more preferably in the range of 3-11, 4-11 or 6-11; when selected from (CH$_2$)m-[Si(L2)-O]q-Si(L2)-(CH$_2$)p then m and p are preferably 3-12, more preferably 5-10;
T is 1;
for Formula III preferably A, B, B', D are selected from phenyl and/or cyclohexyl and when substituted they are substituted by F;
Z$^5$ is selected from CN, OR, R where R is C3-12 alkyl;
W$_1$ and W$_2$ if present and W$_3$ are independently selected from COO, OCO, single bond.

According to a further aspect of this invention materials of the following formula are provided:

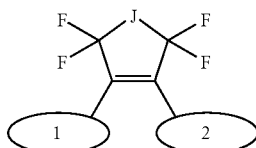

wherein the

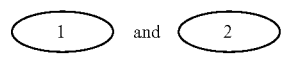

groups are chosen respectively from the following:

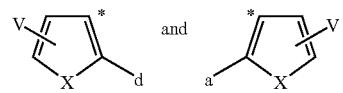

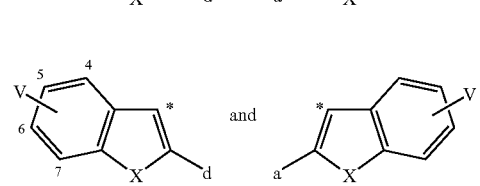

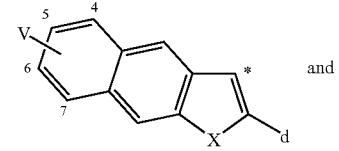

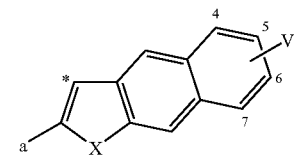

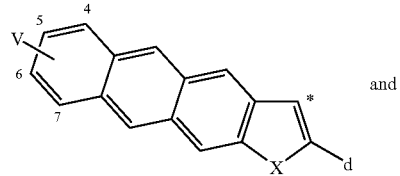

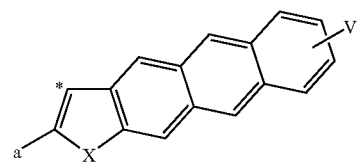

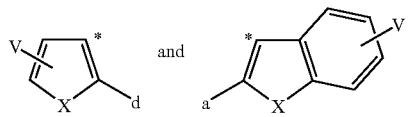

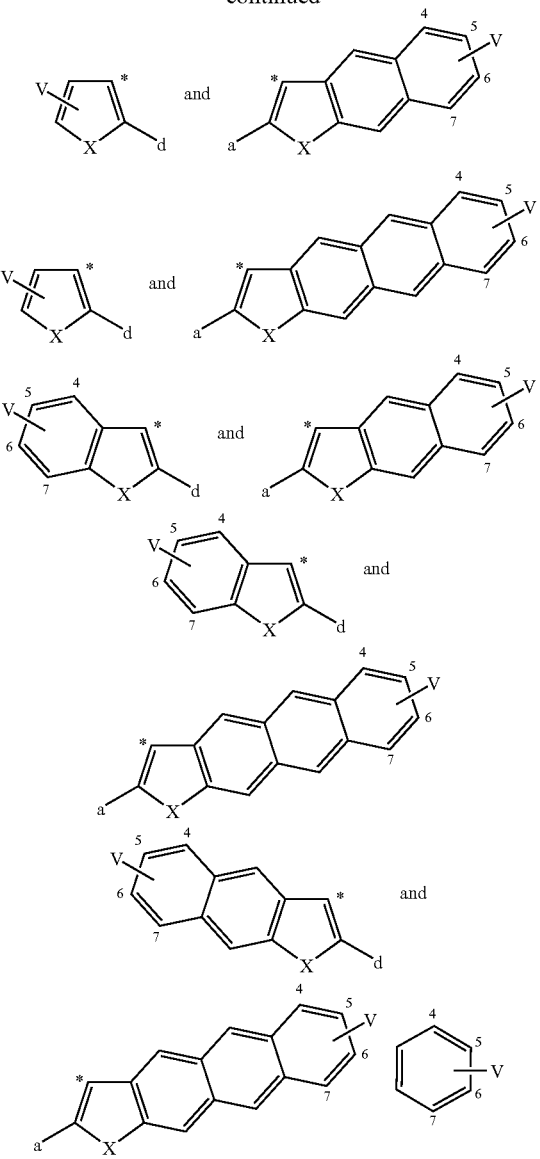

indicates that the group:

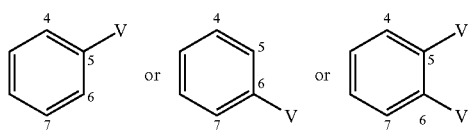

is present and includes unsymmetrical compounds. V is given by OH, COOH and $O(CH_2)_mCHCH_2$ wherein m is 2-20; provided that when V is COOH then the compound is unsymmetrical.

The a, d and X groups are given according to the first aspect of the invention and * indicates the point of attachment.

The compounds of Formulae I and Ib may be synthesised via the reaction of the following general structure

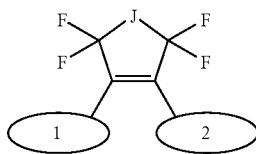

Wherein the

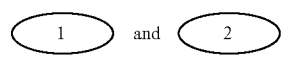

groups are chosen respectively from the following:

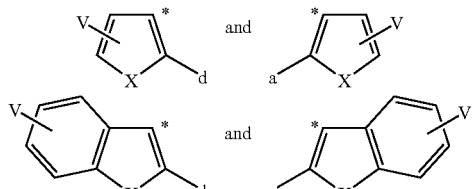

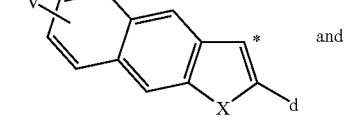

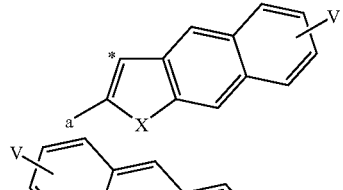

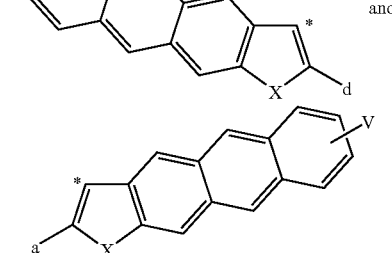

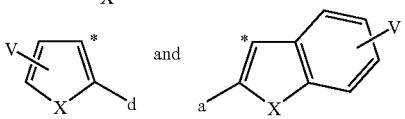

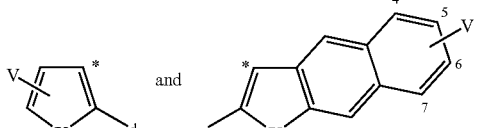

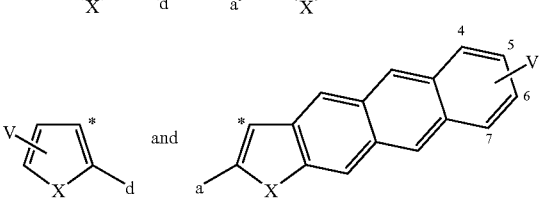

-continued

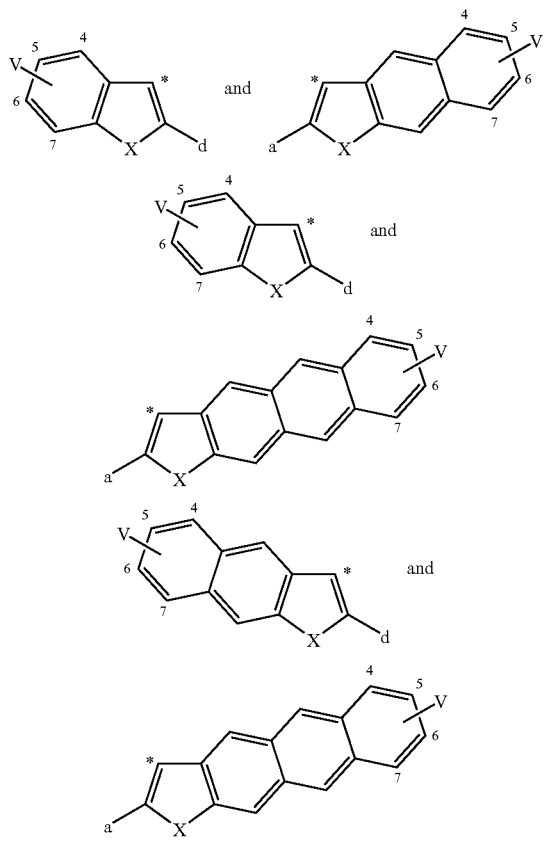

i.e. V is typically independently selected from OH, COOH or O(CH$_2$)mCHCH$_2$ where m is 2-20;

with a suitable mesogenic group substituted with an active group such as Br, OH or COOH. In the case where the spacer group is a siloxane then the mesogenic group may be substituted with the group (CH$_2$)pSi(L2)[OSi(L2)]qH.

The a, d and X groups are given according to the first aspect of the invention and * indicates the point of attachment.

The materials of Formula I and Ib may be converted between these two forms as set out below.

Wherein A is substantially in the range 400-2000 nm, preferably 400-1000 nm, more preferably 500-900 nm.

B is in the range 280-500 nm.

The factors that determine this conversion include the nature of the functional groups present, e.g. their electron withdrawing and releasing nature.

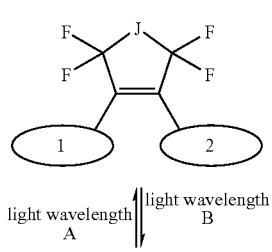

The materials represented below may be converted between the two forms (representative of I and Ib) as indicated:

The materials of the present invention may be used in a variety of devices particularly electro-optic devices. Suitable examples include liquid crystal devices wherein the present materials may provide a variety of functions. For example they may be used as surface alignment materials and/or in the bulk of the liquid crystal layer. They are of use in ferroelectric and nematic mixtures/devices.

The materials of the present invention advantageously possess one or more of the following properties:

Good optical stability
Low writing energy density
High number of read/write cycles
Thermally stable
UV stable
Different phase properties on going from Formula I to Ib
Different UV absorption properties on going from Formula I to Ib.

Figure 11:
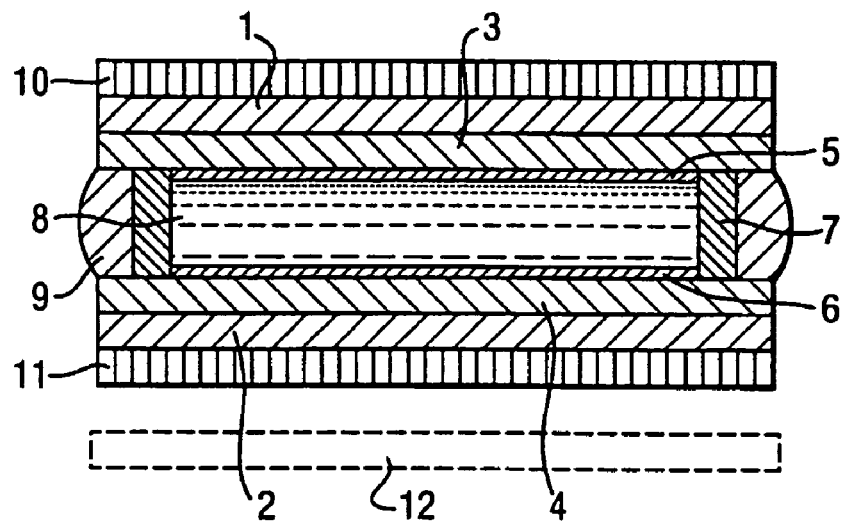

The invention will now be described by way of example with reference to the following drawings:

FIGS. 1-10 are synthetic schemes which are illustrative of the current invention FIG. 11 is a typical liquid crystal device incorporating the materials of the present invention.

FIGS. 12-16 demonstrate the modulation of the absorption behaviours of some of the compounds exemplified following irradiation.

A range of compounds was made by way of example. The compound numbers are referred to in the Tables.

Compound 1

1,2-Bis(6-carboxy-2-methylbenzo[b]thiophen-3-yl) hexafluorocyclopentene and 4'-(2-Hydroxy-ethoxy)-biphenyl-4-carbonitrile are synthesised according to the literature. The compound 1 is obtained as follows:

0.25 g (0.45 mmol) of 1,2-Bis(6-carboxy-2-methylbenzo[b]thiophen-3-yl)hexafluorocyclo-pentene and 0.26 g (1.07 mmol) of 4'-(2-Hydroxy-ethoxy)-biphenyl-4-carbonitrile are dissolved in 25 mL of dry $CH_2Cl_2$. 5.7 mg (0.045 mmol) of DMAP, then 0.13 g (1.07 mmol) of DIC are added. After stirring at room temperature for 2 h, the solvent is distilled off under reduced pressure. The resulting product is purified by column chromatography on silica gel using $CH_2Cl_2$ as eluent to give a pure product as a white solid (0.33 g, 77% yield).

Empirical formula: $C_{53}H_{38}F_6N_2O_6S_2$, Molar mass: 955.14, Transition/T° C.: Cryst>350 Iso liq.

Compound 2

The compound 2 is prepared according to the same procedure to that described for the preparation of the compound 1.

The precursors in this case are 1,2-Bis(6-carboxy-2-methylbenzo[b]thiophen-3-yl)hexafluorocyclopentene and 4'-(6-Hydroxy-hexyloxy)-biphenyl-4-carbonitrile.

Yield: 72%, Empirical formula: $C_{61}H_{54}F_6N_2O_6S_2$, Molar mass: 1067.23.

Compound 3

The compound 3 is prepared according to the same procedure to that described for the preparation of the compound 1.

The precursors in this case are 1,2-Bis(6-carboxy-2-methylbenzo[b]thiophen-3-yl)hexafluorocyclopentene and 4'-(7-Hydroxy-heptyloxy)-biphenyl-4-carbonitrile.

Yield: 76%, Empirical formula: $C_{63}H_{58}F_6N_2O_6S_2$, Molar mass: 1095.28, Transition/T° C.: Cryst 194.9 SmX 72.9 Iso liq.

Compound 4

The compound 4 is prepared according to the same procedure to that described for the preparation of the compound 1.

The precursors in this case are 1,2-Bis(6-carboxy-2-methylbenzo[b]thiophen-3-yl)hexafluorocyclopentene and 4'-(8-Hydroxy-octyloxy)-biphenyl-4-carbonitrile.

Yield: 77%, Empirical formula: $C_{65}H_{62}F_6N_2O_6S_2$, Molar mass: 1123.33.

Compound 5

The compound 5 is prepared according to the same procedure to that described for the preparation of the compound 1.

The precursors in this case are 1,2-Bis(6-carboxy-2-methylbenzo[b]thiophen-3-yl)hexafluorocyclopentene and 4'-(9-Hydroxy-nonyloxy)-biphenyl-4-carbonitrile.

Yield: 72%, Empirical formula: $C_{67}H_{66}F_6N_2O_6S_2$, Molar mass: 1151.38, Transition/T° C.: Cryst 172.3 SmX 69.9 Iso liq.

Compound 6

The compound 6 is prepared according to the same procedure to that described for the preparation of the compound 1.

The precursors in this case are 1,2-Bis(6-carboxy-2-methylbenzo[b]thiophen-3-yl)hexafluorocyclopentene and 4'-(10-Hydroxy-decyloxy)-biphenyl-4-carbonitrile.

Yield: 81%, Empirical formula: $C_{69}H_{70}F_6N_2O_6S_2$, Molar mass: 1179.43, Transition/T° C.: Cryst 169.5 SmX 53.1 Iso liq.

Compound 7

The compound 7 is prepared according to the same procedure to that described for the preparation of the compound 1.

The precursors in this case are 1,2-Bis(6-carboxy-2-methylbenzo[b]thiophen-3-yl)hexafluorocyclopentene and 4'-(11-Hydroxy-undecyloxy)-biphenyl-4-carbonitrile.

Yield: 79%, Empirical formula: $C_{71}H_{74}F_6N_2O_6S_2$, Molar mass: 1229.48, Transition/T° C.: Cryst 179.6 SmX 66.4 Iso liq.

Compound 8

The compound 8 is prepared according to the same procedure to that described for the preparation of the compound 1.

The precursors in this case are 1,2-Bis(6-carboxy-2-methylbenzo[b]thiophen-3-yl)hexafluorocyclopentene and 4'-(12-Hydroxy-dodecyloxy)-biphenyl-4-carbonitrile.

Yield: 73%, Empirical formula: $C_{73}H_{78}F_6N_2O_6S_2$, Molar mass: 1257.53, Transition/T° C.: Cryst 160.1 SmX 57.1 Iso liq.

Compound 9

Step 1

6-Methoxy-2-methylbenzo[b]thiophene 20.20 g (0.12 mol) of 6-Methoxybenzo[b]thiophene diluted in 450 mL of anhydrous THF are introduced into a 3-necked round-bottomed flask under nitrogen. The mixture is cooled to −50° C. 64 mL (0.14 mol) of a 2.5M solution of nBuLi in hexane are added dropwise. The resulting mixture is stirred for 1 h30 at −40° C. and then cooled to −78° C. 52 g (0.36 mol) of MeI are added. The mixture is allowed to return to room temperature, then hydrolysed with 250 mL of water. The water-THF mixture is extracted three times with 300 mL of $Et_2O$. The resulting organic phase is washed several times with saturated aqueous NaCl solution, dried over magnesium sulfate and then concentrated under reduced pressure. The solid collected is recrystallised from methanol to give a white solid (21.25 g, 97% yield).

Empirical formula: $C_{10}H_{10}OS$, Molar mass: 178.25, Melting point:

Step 2

3-Bromo-6-methoxy-2-methylbenzo[b]thiophene

A mixture of 20.63 g (0.13 mol) of 6-Methoxy-2-methylbenzo[b]thiophene and 250 mL of $CHCl_3$ is cooled by using a ice-water bath. A solution consisting of 20.08 g (0.14 mol) of $Br_2$ and 90 mL of $CHCl_3$ is added dropwise. After the addition is completed, the mixture is stirred for 30 min at room temperature and then hydrolysed with 300 mL of saturated aqueous $Na_2S_2O_6$ solution. The aqueous phase is extracted twice with 300 mL of $CHCl_3$. The combined organic phases are washed several times with water, dried over magnesium sulfate and then are concentrated under reduced pressure. The resulting solid recrystallised from methanol gives a white solid (28.50 g, 88% yield).

Empirical formula: $C_{10}H_9BrOS$, Molar mass: 257.15, Melting point: 80-81° C.

Step 3

1,2-Bis(6-methoxy-2-methylbenzo[b]thiophen-3-yl) hexafluorocyclopentene

To a stirred solution of 10 g (0.039 mol) of 3-Bromo-6-methoxy-2-methylbenzo[b]thiophene in 150 mL of anhydrous THF is added dropwise 15.6 mL (0.039 mol) of a 2.5M solution of nBuLi in hexane at −78° C. under nitrogen atmosphere. The resulting mixture is stirred for 30 min at −78° C., then 4.12 g (0.019 mol) of perfluorocyclopentene is added in single portion. After the addition is completed, the mixture is allowed to return to room temperature, then hydrolysed with 150 mL of water. The mixture THF-water is extracted three times with 150 mL of $Et_2O$. The resulting organic phase is washed several times with saturated aqueous NaCl solution, dried over magnesium sulfate and then concentrated under reduced pressure. The crude product is purified by column chromatography on silica gel and eluted with mixtures consisting of pentane and $CH_2Cl_2$ of increasing polarity (100:0 to 70:30). The resulting solid is recrystallised from methanol to give a white solid (6.50 g, 62% yield).

Empirical formula: $C_{25}H_{18}F_6O_2S_2$, Molar mass: 528.53, Melting point: 182-183° C.

Step 4

1,2-Bis(6-hydroxy-2-methylbenzo[b]thiophen-3-yl) hexafluorocyclopentene 5.60 g (0.01 mol) of the compound obtained in step 3 and 100 mL of pre-distilled $CH_2Cl_2$ are introduced into a 3-necked round-bottomed flask under nitrogen. The resulting mixture is cooled by using a ice-water bath, then 4.91 mL (0.05 mol) of $BBr_3$ is added dropwise. The solution is warmed to room temperature and stirred for 6 hours. Then, the mixture is cooled by using a ice-water bath and 100 mL of 10% HCl aqueous solution is added slowly. The chlorinated phase is separated from the aqueous phase. This latter is extracted several times with ethyl acetate. The combined organic phases are washed with water, dried over magnesium sulfate and then are concentrated under reduced pressure. The crude product is purified by column chromatography on silica gel and eluted with mixtures consisting of $CH_2Cl_2$ and $Et_2O$ of increasing polarity (100:0 to 90:10) to give a white solid (4.7 g, 93% yield).

Empirical formula: $C_{23}H_{14}F_6O_2S_2$, Molar mass: 500.48, Melting point: 236-237° C.

Step 5

0.15 g (0.30 mmol) of the compound obtained in step 4 and 0.26 g (0.70 mmol) of 11-(4'-Cyano-biphenyl-4-yloxy)-decanoic acid are dissolved in 30 mL of dry $CH_2Cl_2$. 4 mg (0.030 mmol) of DMAP, then 0.088 g (0.72 mmol) of DIC are added. The mixture is stirred at room temperature for 2 h. The solvent is distilled off and then the resulting product is purified by column chromatography on silica gel using $CH_2Cl_2$ as eluent to give a pure product as a white solid (0.25 g, 70% yield).

Empirical formula: $C_{69}H_{70}F_6N_2O_4S_2$, Molar mass: 1201.43, Transition/T° C.: SmX 69.3 N 78.5 Iso liq.

Compound 10

The compound 10 is obtained according to the same procedure to that described in Step 5 of the synthesis of the compound 9.

The precursors in this case are 1,2-Bis(6-hydroxy-2-methylbenzo[b]thiophen-3-yl)hexafluorocyclopentene obtained in Step 4 of the synthesis of the compound 9 and 11-(4'-Cyano-biphenyl-4-yloxy)-undecanoic acid.

Yield: 78%, Empirical formula: $C_{71}H_{74}F_6N_2O_6S_2$, Molar mass: 1229.48, Transition/T° C.: SmX 55.8 N 60.8 Iso liq.

Compound 11

Step 1

5-Methoxy-2-methylbenzo[b]thiophene

This compound is prepared according to the same procedure to that described in Step 1 of the synthesis of the compound 9 from 5-Methoxybenzo[b]thiophene obtained according to the same procedure to that described in the literature.

Yield: 92%, Empirical formula: $C_{10}H_{10}OS$, Molar mass: 178.25, Melting point: 97-98° C.

Step 2

3-Bromo-5-methoxy-2-methylbenzo[b]thiophene

This compound is prepared according to the same procedure to that described in Step 2 of the synthesis of the compound 9 from 5-Methoxy-2-methylbenzo[b]thiophene.

Yield: 40%, Empirical formula: $C_{10}H_9BrOS$, Molar mass: 257.15, Liquid.

Step 3

1,2-Bis(5-methoxy-2-methylbenzo[b]thiophen-3-yl) hexafluorocyclopentene

This compound is prepared according to the same procedure to that described in Step 3 of the synthesis of the compound 9 from 3-Bromo-5-methoxy-2-methylbenzo[b] thiophene obtained in Step 2.

Yield: 69%, Empirical formula: $C_{25}H_{18}F_6O_2S_2$, Molar mass: 528.53, Melting point: 128-129° C.

Step 4

1,2-Bis(5-hydroxy-2-methylbenzo[b]thiophen-3-yl) hexafluorocyclopentene

This compound is prepared according to the same procedure to that described in Step 4 of the synthesis of the compound 9 from 1,2-Bis(5-methoxy-2-methylbenzo[b] thiophen-3-yl)hexafluorocyclopentene obtained in Step 3.

Yield: 87%, Empirical formula: $C_{23}H_{14}F_6O_2S_2$, Molar mass: 500.48, Melting point: 250-251° C.

Step 5

0.15 g (0.30 mmol) of the compound obtained in step 4 and 0.26 g (0.70 mmol) of 11-(4'-Cyano-biphenyl-4-yloxy)-decanoic acid are dissolved in 30 mL of dry $CH_2Cl_2$. 4 mg (0.030 mmol) of DMAP, then 0.088 g (0.72 mmol) of DIC are added. The mixture is stirred at room temperature for 2 h. The solvent is distilled off and then the resulting product is purified by column chromatography on silica gel using $CH_2Cl_2$ as eluent to give a pure product as a white solid (0.27 g, 74% yield).

Empirical formula: $C_{69}H_{70}F_6N_2O_4S_2$, Molar mass: 1201.43, Transition/T° C.: Cryst 140.2 N 92.0 Iso liq.

Compound 12

The compound 12 is obtained according to the same procedure to that described in step 5 of the synthesis of the compound 11.

The precursors in this case are 1,2-Bis(5-hydroxy-2-methylbenzo[b]thiophen-3-yl)hexafluorocyclopentene obtained in Step 4 of the synthesis of the compound 11 and 11-(4'-Cyano-biphenyl-4-yloxy)-undecanoic acid.

Yield: 73%, Empirical formula: $C_{71}H_{74}F_6N_2O_6S_2$, Molar mass: 1229.48, Transition/T° C.: Cryst 140.2 N 92.0 Iso liq.

Compound 13

Step 1

1-[6-Methoxy-2-methylbenzo[b]thiophen-3-yl]-heptafluorocyclopentene

To a stirred solution of 7.61 g (0.03 mol) of 3-Bromo-6-methoxy-2-methylbenzo[b]thiophene (compound obtained in Step 2 of the synthesis of the compound 9) in 120 mL of anhydrous THF is added dropwise 11.90 mL (0.034 mol) of a 2.5M solution of nBuLi in hexane at −78° C. under nitrogen atmosphere. The resulting mixture is stirred for 30 min at −78° C., then 20 g (0.09 mol) of perfluorocyclopentene is added in a single portion. After the addition is completed, the mixture is allowed to return to room temperature, then hydrolysed with 120 mL of water. The mixture THF-water is extracted three times with 150 mL of Et$_2$O. The resulting organic phase is washed several times with saturated aqueous NaCl solution, dried over magnesium sulfate and then concentrated under reduced pressure. The crude product purified by column chromatography on silica gel and eluted with mixtures consisting of pentane and CH$_2$Cl$_2$ of increasing polarity (100:0 to 80:20) gives an oily product (8.12 g, 72% yield), pure enough to be used in the next step without further purification.

Empirical formula: $C_{15}H_{15}F_7OS$, Molar mass: 376.33.

Step 2

1-(5-Methoxy-2-methylbenzo[b]thiophen-3-yl)-2-(6'-methoxy-2'-methylbenzo[b]thiophen-3'-yl)-hexafluorocyclopentene To a stirred solution of 4.78 g (0.018 mol) of the compound obtained in Step 1 in 100 mL of anhydrous THF is added dropwise 7.2 mL (0.018 mol) of a 2.5M solution of nBuLi in hexane at −78° C. under nitrogen atmosphere. The resulting mixture is stirred for 30 min at −78° C., then a solution of 7 g (0.018 mol) of the synthesis of the compound obtained in Step 2 of the synthesis of the compound 11 and 40 mL of anhydrous THF is added slowly. After the addition is completed, the mixture is allowed to return to room temperature, then hydrolysed with 140 mL of water. The mixture THF-water is extracted three times with 150 mL of Et$_2$O. The resulting organic phase is washed several times with saturated aqueous NaCl solution, dried over magnesium sulfate and then concentrated under reduced pressure. The crude product is purified by column chromatography on silica gel and eluted with mixtures consisting of pentane and CH$_2$Cl$_2$ of increasing polarity (100:0 to 70:30). The resulting solid is recrystallised from methanol to give a white solid (5.42 g, 57% yield).

Empirical formula: $C_{25}H_{18}F_6O_2S_2$, Molar mass: 528.53, Melting point: 118-119° C.

Step 3

1-(5-Hydroxy-2-methylbenzo[b]thiophen-3-yl)-2-(6'-hydroxy-2'-methylbenzo[b]thiophen-3'-yl)-hexafluorocyclopentene This compound is prepared according to the same procedure to that described in Step 4 of the synthesis of the compound 9 from the compound obtained in Step 2.

Yield: 91%, Empirical formula: $C_{23}H_{14}F_6O_2S_2$, Molar mass: 500.48, Melting point: 228° C.

Step 4

0.15 g (0.30 mmol) of the compound obtained in step 3 and 0.26 g (0.70 mmol) of 11-(4'-Cyano-biphenyl-4-yloxy)-decanoic acid are dissolved in 30 mL of dry CH$_2$Cl$_2$. 4 mg (0.030 mmol) of DMAP, then 0.088 g (0.72 mmol) of DIC are added. The mixture is stirred at room temperature for 2 h. The solvent is distilled off and then the resulting product is purified by column chromatography on silica gel using CH$_2$Cl$_2$ as eluent to give a pure product as a white solid (0.27 g, 74% yield).

Empirical formula: $C_{69}H_{70}F_6N_2O_4S_2$, Molar mass: 1201.43, Transition/T° C.: SmX 74.3 N 87.8 Iso liq.

Compound 14

The compound 14 is obtained according to the same procedure to that described in step 4 of the synthesis of the compound 13.

The precursors in this case are 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13 and 11-(4'-Cyano-biphenyl-4-yloxy)-undecanoic acid.

Yield: 78%, Empirical formula: $C_{71}H_{74}F_6N_2O_6S_2$, Molar mass: 1229.48, Transition/T° C.: SmX 56.9 N 65.6 Iso liq.

Compound 15

A mixture of 0.15 g (0.30 mmol) of 1,2-Bis(6-hydroxy-2-methylbenzo[b]thiophen-3-yl)hexafluorocyclopentene obtained in Step 4 of the synthesis of the compound 9, 0.26 g (0.72 mmol) of 4'-(6-Bromo-hexyloxy)-biphenyl-4-carbonitrile, 0.10 g (0.72 mmol) of K$_2$CO$_3$ and 20 mL of dry butanone is refluxed for 24 h, then allowed to return to room temperature. The reaction mixture is filtered and the butanone is distilled off under reduced pressure. The crude product purified by column chromatography on silica gel using CH$_2$Cl$_2$ as eluent gives a pure product as a white solid (0.26 g, 81% yield).

Empirical formula: $C_{61}H_{58}F_6N_2O_4S_2$, Molar mass: 1061.25, Transition/T° C.: SmX 78.9 N 95.5 Iso liq.

Compound 16

The compound 16 is obtained according to the same procedure to that described for the preparation of the compound 15.

The precursors in this case are 1,2-Bis(6-hydroxy-2-methylbenzo[b]thiophen-3-yl)hexafluorocyclopentene obtained in Step 4 of the synthesis of the compound 9 and 4'-(10-Bromo-decyloxy)-biphenyl-4-carbonitrile.

Yield: 87%, Empirical formula: $C_{69}H_{74}F_6N_2O_4S_2$ Molar mass: 1173.46, Transition/T° C.: SmX 73.6 N 77.5 Iso liq.

Compound 17

The compound 17 is obtained according to the same procedure to that described for the preparation of the compound 15.

The precursors in this case are 1,2-Bis(6-hydroxy-2-methylbenzo[b]thiophen-3-yl)hexafluorocyclopentene obtained in Step 4 of the synthesis of the compound 9 and 4'-(11-Bromo-undecyloxy)-biphenyl-4-carbonitrile.

Yield: 86%, Empirical formula: $C_{71}H_{78}F_6N_2O_4S_2$, Molar mass: 1201.51, Transition/T° C.: SmX 57.7 N 61.4 Iso liq.

Compound 18

A mixture of 0.15 g (0.30 mmol) of 1,2-Bis(5-hydroxy-2-methylbenzo[b]thiophen-3-yl)hexafluorocyclopentene obtained in Step 4 of the synthesis of the compound 11, 0.30 g (0.72 mmol) of 4'-(10-Bromo-doceloxy)-biphenyl-4-carbonitrile, 0.10 g (0.72 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.29 g, 84% yield).

Empirical formula: $C_{69}H_{74}F_6N_2O_4S_2$, Molar mass: 1173.46, Transition/T° C.: Cryst 141.3 N 88.8 Iso liq.

Compound 19

The compound 19 is obtained according to the same procedure to that described for the preparation of the compound 18.

The precursors in this case are 1,2-Bis(5-hydroxy-2-methylbenzo[b]thiophen-3-yl)hexafluorocyclopentene obtained in Step 4 of the synthesis of the compound 11 and 4'-(11-Bromo-undecyloxy)-biphenyl-4-carbonitrile.

Yield: 81%, Empirical formula: $C_{71}H_{78}F_6N_2O_4S_2$, Molar mass: 1201.51, Transition/T° C.: Cryst 120.5 SmX 51.3 N 61.7 Iso liq.

Compound 20

A mixture of 0.15 g (0.30 mmol) of 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13, 0.26 g (0.72 mmol) of 4'-(6-Bromohexyloxy)-biphenyl-4-carbonitrile, 0.10 g (0.72 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.27 g, 84% yield).

Empirical formula: $C_{61}H_{58}F_6N_2O_4S_2$, Molar mass: 1061.25, Transition/T° C.: N 113.2 Iso liq.

Compound 21

The compound 21 is obtained according to the same procedure to that described for the preparation of the compound 20.

The precursors in this case are 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13 and 4'-(10-Bromo-decyloxy)-biphenyl-4-carbonitrile.

Yield: 78%, Empirical formula: $C_{69}H_{74}F_6N_2O_4S_2$, Molar mass: 1173.46, Transition/T° C.: SmX 56.9 N 66.6 Iso liq.

Compound 22

The compound 22 is obtained according to the same procedure to that described for the preparation of the compound 20.

The precursors in this case are 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13 and 4'-(11-Bromo-undecyloxy)-biphenyl-4-carbonitrile.

Yield: 87%, Empirical formula: $C_{71}H_{78}F_6N_2O_4S_2$, Molar mass: 1201.51, Transition/T° C.: SmX 52.7 N 61.1 Iso liq.

Compound 23

Step 1

A mixture of 0.50 g (0.98 mmol) of 1,2-Bis(6-hydroxy-2-methylbenzo[b]thiophen-3-yl)hexafluorocyclopentene obtained in Step 4 of the synthesis of the compound 9, 0.42 g (0.98 mmol) of 4'-(11-Bromo-undecyloxy)-biphenyl-4-carbonitrile, 0.16 g (1.2 mmol) of $K_2CO_3$ and 70 mL of dry butanone is refluxed for 24 h, then allowed to return to room temperature. The reaction mixture is filtered and the butanone is distilled off under reduced pressure. The crude product purified by column chromatography on silica gel using a mixture of $CH_2Cl_2$ and $Et_2O$ (95/5) as eluent gives a pure product as a white solid (0.38 g, 45% yield).

Empirical formula: $C_{47}H_{49}F_6NO_3S_2$, Molar mass: 854.02, Melting point: 71-72° C.

Step 2

A mixture of 0.15 g (0.17 mmol) of the compound obtained in step 1 and 0.10 g (0.26 mmol) of 11-(4'-Cyano-biphenyl-4-yloxy)-undecanoic acid is dissolved in 20 mL of dry $CH_2Cl_2$. 3.2 mg (0.022 mmol) of DMAP, then 32 mg (0.26 mmol) of DIC is added. The mixture is stirred at room temperature for 2 h. The solvent is distilled off and then the resulting product is purified by column chromatography on silica gel using $CH_2Cl_2$ as eluent to give a pure product as a white solid (0.19 g, 92% yield).

Empirical formula: $C_{71}H_{76}F_6N_2O_5S_2$, Molar mass: 1215.50, Transition/T° C.: SmX 57.8 N 62.1 Iso liq.

Compound 24

A mixture of 0.10 g (0.12 mmol) of the compound obtained in step 1 for the preparation of the compound 23, 0.06 g (0.17 mmol) of 4'-(6-Bromo-hexyloxy)-biphenyl-4-carbonitrile, 0.02 g (0.014 mmol) of $K_2CO_3$ and 15 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.12 g, 89% yield).

Empirical formula: $C_{66}H_{68}F_6N_2O_4S_2$, Molar mass: 1131.38, Transition/T° C.: SmX 53.5 N 61.9 Iso liq.

Compound 25

Step 1

4-Octyloxy-benzoic acid (4'-hydroxy-biphenyl-4-yl) ester 4.5 g (0.018 mol) of 4-Octyloxy-benzoic acid, 7.0 g (0.038 mol) of 4,4'-Dihydroxy biphenyl and 0.46 g (3.7 mmol) of DMAP are dissolved in 65 mL of dry THF and 4.4 g (0.021 mol) of DCC is added. After stirring for 18 h at room temperature, the suspension is filtered. The residue is dissolved in a hot solution of hexane:$CHCl_3$:THF=2:2:1 and after cooling to room temperature, the precipitate is filtered off. The recrystallisation is repeated until the TLC indicates pure white product (3.7 g, 49% yield).

Empirical formula: $C_{27}H_{30}O_4$, Molar mass: 418.53, Melting point: 183° C.

Step 2

4-Octyloxy-benzoic acid (4'-(11-bromo-undecyloxy)-biphenyl-4-yl) ester

A mixture of 3.5 g (8.4 mmol) of 4-Octyloxy-benzoic acid (4'-hydroxy-biphenyl-4-yl) ester, 7.88 g (25 mmol) of 1,11-Dibromoundecane, 3.45 g (25 mmol) of $K_2CO_3$ and 50 mL of dry butanone is refluxed for 24 h, then allowed to return to room temperature. The reaction mixture is filtered off and the butanone is distilled off under reduced pressure. The crude product purified by column chromatography on silica gel using $CH_2Cl_2$ as eluent gives a pure product as a white solid (5.35 g, 85% yield).

Empirical formula: $C_{37}H_{49}BrO_4$, Molar mass: 637.69, Transition/T° C.: Cryst 106.2 SmC 115.6 SmA 153.2 N 171.6 Iso liq.

Step 3

A mixture of 0.15 g (0.3 mmol) of 1,2-Bis(6-hydroxy-2-methylbenzo[b]thiophen-3-yl)hexafluorocyclopentene obtained in Step 4 of the synthesis of the compound 9, 0.56 g (0.9 mmol) of 4-Octyloxy-benzoic acid (4'-(11-bromo-undecyloxy)-biphenyl-4-yl) ester obtained in Step 2, 0.12 g (0.9 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.36 g, 74% yield).

Empirical formula: $C_{100}H_{124}F_6O_6S_2$, Molar mass: 1664.17, Transition/T° C.: SmX 87.9 SmA 161.4 Iso liq.

Compound 26

A mixture of 0.15 g (0.3 mmol) of 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13, 0.56 g (0.9 mmol) of 4-Octyloxybenzoic acid (4'-(11-bromo-undecyloxy)-biphenyl-4-yl) ester obtained in Step 2 of the synthesis of the compound 25, 0.12 g (0.9 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.39 g, 79% yield).

Empirical formula: $C_{100}H_{124}F_6O_{10}S_2$, Molar mass: 1664.17, Transition/T° C.: SmX 90.7 SmA 94.2 N 162.7 Iso liq.

Compound 27

Step 1

4-(4-Hydroxy-cyclohexyl)-phenol 10 g (0.052 mol) of 4-(4-Hydroxy-phenyl)-cyclohexanone is dissolved in 300 mL of methanol. 2.13 g (0.058 mol) of $NaBH_4$ is added at room temperature by small portion for 2 hours. After stirring over night, the mixture is cooled using an ice-water bath, then hydrolysed with a solution of 10% HCl aqueous solution. The solution is extracted several times with ethyl acetate. The resulting organic phase is washed with water, dried over magnesium sulfate, then concentrated under reduced pressure. The residue recrystallised from ethanol gives pure white crystals (8.7 g, 87% yield).

Empirical formula: $C_{12}H_{16}O_2$, Molar mass: 192.25, Melting point: 213-215° C.

Step 2

4-[4-(11-Bromo-undecyloxy)-phenyl]-cyclohexanol

A mixture of 2.40 g (0.012 mol) of 4-(4-Hydroxy-cyclohexyl)-phenol obtained in Step 1, 11.76 (0.037 mol) of 1,11-Dibromoundecane, 5.17 g (0.037 mol) of $K_2CO_3$ and 40 mL of dry butanone is refluxed for 24 h, then allowed to return to room temperature. The reaction mixture is filtered off and the butanone is distilled off under reduced pressure. The crude product is purified by recrystallisation from ethanol to give a pure product as a white solid (4.34 g, 85% yield).

Empirical formula: $C_{23}H_{37}BrO_2$, Molar mass: 425.44, Melting point: 100-101° C.

Step 3

4-Octyloxy-benzoic acid 4-[4-(11-bromo-undecyloxy)-phenyl]-cyclohexyl ester 3 g (7.05 mmol) of 4-[4-(11-Bromo-undecyloxy)-phenyl]-cyclohexanol obtained in Step 2 and 2.02 g (7.52 mmol) of 4-Octyloxy-benzoyl chloride are dissolved in 100 mL of dry $CH_2Cl_2$. 0.95 g (7.52 mmol) of DMAP are added. The mixture is stirred at room temperature over night. The solvent is distilled off and then the resulting product is purified by column chromatography on silica gel using $CH_2Cl_2$ as eluent to give a pure product as a white solid (3.8 g, 82% yield).

Empirical formula: $C_{38}H_{57}BrO_4$, Molar mass: 657.76, Transition/T° C.: Cryst 77.1 SmC 95.9 SmA 112.8 N 127.6 Iso liq.

Step 4

A mixture of 0.10 g (0.2 mmol) of 1,2-Bis(6-hydroxy-2-methylbenzo[b]thiophen-3-yl)hexafluorocyclopentene obtained in Step 4 of the synthesis of the compound 9, 0.31 g (0.47 mmol) of 4-Octyloxy-benzoic acid 4-[4-(11-bromo-undecyloxy)-phenyl]-cyclohexyl ester obtained in Step 3, 0.065 g (0.47 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.25 g, 76% yield).

Empirical formula: $C_{100}H_{132}F_6O_{10}S_2$, Molar mass: 1671.23.

Compound 28

A mixture of 0.10 g (0.2 mmol) of 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13, 0.31 g (0.47 mmol) of 4-Octyloxybenzoic acid 4-[4-(11-bromo-undecyloxy)-phenyl]-cyclohexyl ester obtained in Step 3 of the synthesis of the compound 27, 0.065 g (0.47 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.27 g, 84% yield).

Empirical formula: $C_{100}H_{132}F_6O_{10}S_2$, Molar mass: 1672.23.

Compound 29

Step 1

4-(1-R(−)-Methyl-heptyloxy)-benzoic acid methyl ester 10.68 g (0.070 mol) of 4-Hydroxy-benzoic acid methyl ester, 8.10 g (0.062 mol) of S(+)-Octan-2-ol, 15.10 (0.070 mol) of DIAD are dissolved in 120 mL of anhydrous THF. 18.39 g (0.070 mol) of $PPh_3$ is added by small portion for 30 min. After stirring for 3 h, the solvent is distilled off under reduced pressure. The crude product purified by column chromatography on silica gel using $CH_2Cl_2$ as eluent gives a pure oily product (23.46 g, 92% yield).

Empirical formula: $C_{16}H_{24}O_3$, Molar mass: 264.36.

Step 2

4-(1-R(−)-Methyl-heptyloxy)-benzoic acid 10 g (0.039 mol) of 4-(1-R(−)-Methyl-heptyloxy)-benzoic acid methyl ester obtained in Step 1 is dissolved in 100 mL of THF. A solution of 22 g (0.39 mol) of KOH in 40 mL of water is added. The mixture is heated up to reflux and stirred for 6 h. The mixture is allowed to return to room temperature, then the solvents are distilled off and ice-water is added. After acidification with concentrated HCl, the mixture is extracted several times with $CH_2Cl_2$. The resulting organic phase is dried over magnesium sulfate and concentrated under reduced pressure. The product is recrystallised from hexane to give a pure product as white crystals (8.88 g, 91% yield).

Empirical formula: $C_{15}H_{22}O_3$, Molar mass: 250.33, Melting point: 68-69° C.

Step 3

4-(1-R(−)-Methyl-heptyloxy)-benzoic acid 4-[4-(11-bromo-undecyloxy)-cyclohexyl]-phenyl ester 3 g (7.05 mmol) of 4-[4-(11-Bromo-undecyloxy)-phenyl]-cyclohexanol obtained in Step 2 of the synthesis of the compound 27 and 1.76 g (7.05 mmol) of 4-(1-R(−)-Methyl-heptyloxy)-benzoyl chloride (obtained from the corresponding acid and $SOCl_2$ by refluxing for 2 h) are dissolved in 40 mL of dry $CH_2Cl_2$. 1.06 g (8.46 mmol) of DMAP is added. The mixture is stirred at room temperature over night. The solvent is distilled off and then the resulting product is purified by column chromatography on silica gel using $CH_2Cl_2$ as eluent to give a pure product as a white solid (3.61 g, 78% yield).

Empirical formula: $C_{38}H_{57}BrO_4$, Molar mass: 657.76, Transition/T° C.:

Step 4

A mixture of 0.10 g (0.2 mmol) of 1,2-Bis(6-hydroxy-2-methylbenzo[b]thiophen-3-yl)hexafluorocyclopentene obtained in Step 4 of the synthesis of the compound 9, 0.31 g (0.47 mmol) of 4-(1-R(−)-Methyl-heptyloxy)-benzoic acid 4-[4-(11-Bromo-undecyloxy)-cyclohexyl]-phenyl ester, 0.065 g (0.47 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.28 g, 87% yield).

Empirical formula: $C_{100}H_{132}F_6O_{10}S_2$, Molar mass: 1671.23, Transition/T° C.: Cryst 72.1 SmX 43.6 SmA 60.5 Iso liq.

Compound 30

A mixture of 0.10 g (0.2 mmol) of 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13, 0.31 g (0.47 mmol) of 4-(1-R(−)-Methyl-heptyloxy)-benzoic acid 4-[4-(11-bromo-undecyloxy)-cyclohexyl]-phenyl ester obtained in Step 3 of the synthesis of the compound 29, 0.065 g (0.47 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.27 g, 84% yield).

Empirical formula: $C_{100}H_{132}F_6O_{10}S_2$, Molar mass: 1671.23, Transition/T° C.: Cryst 80.5 SmX 45.8 SmA 62.6 Iso liq.

Compound 31

A mixture of 0.10 g (0.2 mmol) of 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13, 0.15 g (0.23 mmol) of 4-(1-R(−)-Methylheptyloxy)-benzoic acid 4-[4-(11-bromo-undecyloxy)-cyclohexyl]-phenyl ester obtained in step 3 of the synthesis of the compound 29, 0.065 g (0.47 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.23 g, 80% yield).

Empirical formula: $C_{85}H_{105}F_6NO_7S_2$, Molar mass: 1430.87, Transition/T° C.: Tg 25.3 SmA 66.2 Iso liq.

Compound 32

Step 1

4-(12-Bromo-undecyloxy)-benzoic acid methyl ester

A mixture of 5 g (0.032 mol) of 4-Hydroxy-benzoic acid methyl ester, 30.94 g (0.098 mol) of 1,11-Dibromo undecane, 13.53 g (0.098 mol) of $K_2CO_3$ and 80 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (10.60 g, 86% yield).

Empirical formula: $C_{19}H_{29}BrO_3$, Molar mass: 385.34, Melting point: 55-56° C.

4-(11-Bromo-undecyloxy)-benzoic acid 8 g (0.021 mol) of 4-(12-Bromo-undecyloxy)-benzoic acid methyl ester obtained in Step 1 is dissolved in 100 mL of THF. A solution of 10 g (0.24 mol) of NaOH in 35 mL of water is added. The mixture is heated at 40° C. and stirred for 48 h. The mixture is allowed to return to room temperature, then the solvents are distilled off and ice/water is added. After acidification with concentrated HCl, the mixture is extracted with several times with $CH_2Cl_2$. The resulting organic phase is dried over magnesium sulfate and concentrated under reduced pressure. The product recrystallised from hexane gives a pure product as white crystals (7.80 g, 88% yield).

Empirical formula: $C_{18}H_{27}BrO_3$, Molar mass: 371.31, Melting point: 120-121° C.

Step 3

4-(11-Bromo-undecyloxy)-benzoic acid Cholesterol

To a stirred solution of 5.68 g (0.014 mol) of Cholesterol, 5.45 g (0.014 mol) of 4-(12-Bromo-undecyloxy)-benzoyl chloride (obtained from the corresponding acid and $SOCl_2$ by refluxing for 2 h) and 80 mL of dry $CH_2Cl_2$, 2.22 g (0.017 mol) of DMAP are added under nitrogen atmosphere. The mixture is stirred at room temperature over night. The solvent is distilled off and then the resulting product is purified by column chromatography on silica gel using $CH_2Cl_2$ as eluent to give a pure product as a white solid (7.97 g, 77% yield).

Empirical formula: $C_{45}H_{71}BrO_3$, Molar mass: 739.95, Transition/T° C.: Cryst 117.2 SmA 143.7 TGB 143.8 N 190.7 Iso liq.

Step 4

A mixture of 0.15 g (0.29 mmol) of 1,2-Bis(6-hydroxy-2-methylbenzo[b]thiophen-3-yl)hexafluorocyclopentene obtained in Step 4 of the synthesis of the compound 9, 0.56 g (0.76 mmol) of 4-(12-Bromo-undecyloxy)-benzoic acid Cholesterol obtained in Step 3, 0.10 g (0.76 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.43 g, 82% yield).

Empirical formula: $C_{113}H_{160}F_6O_8S_2$, Molar mass: 1824.60, Transition/T° C.: Tg 61.8 SmX* 175.4 Iso liq.

Compound 33

A mixture of 0.15 g (0.29 mmol) of 1-(5-Hydroxy-2-methylbenzo[b]thiophen-3-yl)-2-(6'-hydroxy-2'-methylbenzo[b]thiophen-3'-yl)-hexafluorocyclopentene obtained in Step 3 of the synthesis of the compound 13, 0.56 g (0.77 mmol) of 4-(12-Bromoundecyloxy)-benzoic acid Cholesterol obtained in Step 3 of the synthesis of the compound 32, 0.10 g (0.77 mmol) of $K_2CO_3$ and 15 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.40 g, 75% yield).

Empirical formula: $C_{113}H_{160}F_6O_8S_2$, Molar mass: 1824.60, Transition/T° C.: Tg 62.2 SmX* 174.1 N* 183.1 Iso liq.

Compound 34

Step 1

A mixture of 0.72 g (1.41 mmol) of 1,2-Bis(6-hydroxy-2-methylbenzo[b]thiophen-3-yl)hexafluorocyclopentene obtained in Step 4 of the synthesis of the compound 9, 0.57 g (4.23 mmol) of 4-Bromo-but-1-ene, 0.58 g (4.23 mmol) of $K_2CO_3$ and 35 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure oily product (0.75 g, 87% yield).

Empirical formula: $C_{31}H_{32}F_6O_2S_2$, Molar mass: 614.71.

Step 2

4'-[5-(1,1,3,3-Tetramethyl-disiloxanyl)-pentyloxy]-biphenyl-4-carbonitrile 8.12 g (0.032 mol) of 4'-But-3-enyloxy-biphenyl-4-carbonitrile is dissolved in 80 mL of dry toluene and 21.50 g (0.16 mol) of 1,1,3,3-Tetramethyl-disiloxane is added. Dry air bubbled through the solution for 2 min and few drops of platinium(0)-1,3-divinyl-1,1,3,3-tetramethyldisiloxane complex in xylene are added. After stirring at room temperature for 20 h with exclusion of moisture, the solvent and excess of 1,1,3,3-Tetramethyl-disiloxane are distilled off under reduced pressure. The residue purified by column chromatography on silica gel using a mixture of $CH_2Cl_2$/pentane (75/25) as eluent gives a colourless oil (10.67 g, 84% yield).

Empirical formula: $C_{22}H_{31}NO_2Si_2$, Molar mass: 397.66.

Step 3

0.3 g (0.51 mmol) of the compound obtained in Step 1 and 0.79 g (2.05 mmol) of 14'-[5-(1,1,3,3-Tetramethyl-disiloxanyl)-pentyloxy]-biphenyl-4-carbonitrile obtained in Step 2 are dissolved in 20 mL of dry toluene. Dry air bubbled through the solution for 2 min and few drops of platinium(0)-1,3-divinyl-1,1,3,3-tetramethyldisiloxane complex in xylene are added. After stirring at room temperature for 20 h with exclusion of moisture, the solvent is distilled off under reduced pressure. The residue is purified by column chromatography on silica gel using a mixture of $CH_2Cl_2$/pentane (75/25) as eluent to give a colourless oil (0.53 g, 74% yield).

Empirical formula: $C_{75}H_{94}F_6N_2O_6S_2Si_4$, Molar mass: 1410.02.

Compound 35

0.15 g (0.26 mmol) of the compound obtained in Step 1 of the synthesis of the compound 34 and 0.51 g (0.65 mmol) of 4-Octyloxy-2-[5-(1,1,3,3-tetramethyldisiloxanyl)-pent-1-yloxy]-benzoic acid (4'-undecyloxy-biphenyl-4-yl) ester (obtained according to the same procedure to that described in the literature) are dissolved in 10 mL of dry toluene. Dry air bubbled through the solution for 2 min and few drops of platinium(0)-1,3-divinyl-1,1,3,3-tetramethyldisiloxane complex in xylene are added. After stirring at room temperature for 20 h with the exclusion of moisture, the solvent is distilled off under reduced pressure. The residue is purified by column chromatography using a mixture of $CH_2Cl_2$/pentane (75/25) as eluent to give a colourless oil (0.39 g, 70% yield).

Empirical formula: $C_{125}H_{180}F_6O_{12}S_2Si_4$, Molar mass: 2165.22, Transition/T° C.: Tg −14.3 N 10.7 Iso liq.

Compound 36

Step 1

3-Bromo-benzo[b]thiophene

A mixture of 6 g (0.044 mol) of Benzo[b]thiophene and 80 mL of $CHCl_3$. is cooled by using an ice-water bath. A solution of 7.89 g (0.044 mol) of $Br_2$ and 40 mL of $CHCl_3$ is added slowly. After the addition is completed, the mixture is stirred for 1 h at room temperature and then hydrolysed with 150 mL of saturated aqueous $Na_2S_2O_6$ solution. The aqueous phase is extracted two times with 150 mL of $CHCl_3$. The combined organic phases are washed several times with water, dried over magnesium sulfate and then are concentrated under reduced pressure. The crude product is purified by distillation to give a colourless liquid (8.0 g, 84% yield).

Empirical formula: $C_8H_5BrS$, Molar mass: 213.10.

Step 2

2-[11-(3-Bromo-benzo[b]thiophen-2-yl)-undecyloxy]-tetrahydro-pyran 6.91 g (0.032 mol) of 3-Bromo-benzo[b]thiophene obtained in Step 1 diluted in 180 mL of anhydrous THF are introduced into a 3-necked round-bottomed flask under nitrogen. The mixture is cooled to −78° C. 17.1 mL of a 1.0M solution of LDA are added dropwise. After stirring for 1 h30 at −78° C., 11.80 g (0.035 mol) of 2-(12-Bromo-dodecyloxy)-tetrahydro-pyran (obtained as described in the literature) are added. The mixture is allowed to return to room temperature, then hydrolysed with 150 mL of water. The water-THF mixture is extracted three times with 150 mL of $Et_2O$. The resulting organic phase is washed several times with saturated aqueous NaCl solution, dried over magnesium sulfate and then concentrated under reduced pressure. The crude product purified by column chromatography on silica gel with mixture pentane and ethyl acetate (90:10) as eluent gives a pure oily compound (11 g, 74% yield).

Empirical formula: $C_{24}H_{35}BrO_2S$, Molar mass: 467.50.

Step 3

To a stirred solution of 10.34 g (0.022 mol) of 2-[11-(3-Bromo-benzo[b]thiophen-2-yl)-undecyloxy]-tetrahydro-pyran obtained in Step 2 in 100 mL of THF is added dropwise 9.3 mL of a 2.5M solution of nBuLi in hexane at −78° C. under nitrogen atmosphere. The resulting mixture is stirred for 30 min at −78° C., then 2.34 g (0.011 mol) of perfluorocyclopentene is added in single portion. After the addition is completed, the mixture is allowed to return to room temperature, then hydrolysed with 100 mL of water. The mixture THF-water is extracted three times with 100 mL of $Et_2O$. The resulting organic phase is washed several times with saturated aqueous NaCl solution, dried over magnesium sulfate and then concentrated under reduced pressure. The crude product is purified by column chromatography on silica gel and eluted with mixture consisting of pentane and ethyl acetate (70:30) to give a yellow oily compound (4 g, 38%), pure enough to be used in the next step without further purification.

Empirical formula: $C_{53}H_{76}F_6O_4S_2$, Molar mass: 955.29.

Step 4

3 g (3.10 mmol) of the compound obtained in step 3 is dissolved in 50 mL of ethanol. 78 mg (0.31 mmol) of PPTS is added and the mixture is heated to reflux. After stirring for 6 h, the solvent are distilled off under reduced pressure. The crude product is purified by column chromatography on silica gel and eluted with mixture of pentane and ethyl acetate (50:50) to give a yellow oily compound (2.22 g, 91% yield).

Empirical formula: $C_{43}H_{60}F_6O_2S_2$, Molar mass: 787.06.

Step 5

0.3 g (0.38 mmol) of the compound obtained in step 4, 0.15 (7.8 mmol) of 4'-Hydroxy-biphenyl-4-carbonitrile, 0.16 g (7.8 mmol) of DIAD are dissolved in 30 mL of dry $CH_2Cl_2$. 0.20 g (7.8 mmol) of $PPh_3$ is added by small portion for 30 min. After stirring overnight, the solvent are distilled off under reduced pressure. The crude product is purified by column chromatography on silica gel using $CH_2Cl_2$ as eluent and recrystallised from pentane to give a pure product as a white solid (0.23 g, 54% yield).

Empirical formula: $C_{69}H_{74}F_6N_2O_2S_2$, Molar mass: 1141.46, Transition/T° C.: Cryst 139.8 N 96.7 Iso liq.

Compound 37

Step 1

2-Hydroxy-4-octyloxy benzoic acid methyl ester

To a stirred solution of 51 g (0.30 mol) of Methyl-2,4-dihydroxy benzoic ester, 207 g (1.5 mol) of $K_2CO_3$ in 1 L of dry butanone is added slowly under reflux a solution of 63 mL (0.36 mol) of bromooctane in 200 mL of dry butanone. The reaction mixture is refluxed for 18 h until the reaction is completed. After filtration of the reaction mixture the butanone is distilled off and the residue is recrystallised three times from methanol to give white crystals (74.5 g, 88%).

Empirical formula: $C_{16}H_{242}O_4$, Molar mass: 1141.46, Melting point: 46-47° C.

Step 2

4-Octyloxy-2-(pent-4-en-1-yloxy)benzoic acid methyl ester

A mixture of 66.1 g (0.234 mol) of 2-Hydroxy-4-octyloxy benzoic acid methyl ester obtained in Step 1, 44.7 g (0.30 mol) of 5-Bromopent-1-ene, 207 g (1.5 mol) of $K_2CO_3$ and 700 mL of dry butanone is refluxed for 24 h, then allowed to return to room temperature. The reaction mixture is filtered and the butanone is distilled off under reduced pressure. After drying the residue under vacuum a slightly yellow oil (77.5 g, 95%) is obtained, which can be used in the next step without further purification.

Empirical formula: $C_{21}H_{32}O_3$, Molar mass: 332.48.

Step 3

4-Octyloxy-2-(pent-4-en-1-yloxy)benzoic acid 77.5 g (0.22 mol) of 4-Octyloxy-2-(pent-4-en-1-yloxy) benzoic acid methyl ester obtained in Step 2 is dissolved in 700 mL of THF. A solution of 66.6 (1.19 mol) of KOH in 200 mL of water is added. The mixture is heated to reflux and stirred for 6 h. The mixture is allowed to return to room temperature, then the solvents are distilled off and ice/water is added. After acidification with concentrated HCl, the mixture is extracted with several times with $CH_2Cl_2$. The resulting organic phase is dried over magnesium sulfate and concentrated under reduced pressure. The product recrystallised from hexane gives a pure product as white crystals (66.9 g, 92%).

Empirical formula: $C_{20}H_{30}O_4$, Molar mass: 334.45, Melting point: 67-68° C.

Step 4

4-Octyloxy-benzoic acid 4-(4-hydroxy-cyclohexyl)-phenyl ester 10 g (0.052 mol) of 4-(4-Hydroxy-cyclohexyl)-phenol obtained in Step 1 of the synthesis of the compound 27 and 13.02 g (0.052 mol) of 4-Octyloxy-benzoic acid are dissolved in 120 mL of anhydrous THF. 0.65 g (0.0052 mol) of DMAP, then 6.56 g (0.052 mol) of DIC are added. The mixture is stirred at room temperature overnight. The solvent is distilled off and then the resulting product is purified by column chromatography on silica gel using mixture of hexane and ethyl acetate (70:30) as eluent and recrystallised from ethanol to give a pure product as a white solid (6 g, 27% yield).

Empirical formula: $C_{27}H_{36}O_4$, Molar mass: 424.57, Melting point: 111-112° C.

Step 5

5.23 g (0.012 mol) of 4-Octyloxy-benzoic acid 4-(4-hydroxy-cyclohexyl)-phenyl ester obtained in Step 4 and 4.11 g (0.012 mol) of 4-Octyloxy-2-(pent-4-en-1-yloxy)benzoic acid obtained in Step 3 acid are dissolved in 150 mL of dry $CH_2Cl_2$. 0.15 g (0.0012 mol) of DMAP, then 1.51 g (0.012 mmol) of DIC are added. The mixture is stirred at room temperature overnight. The solvent is distilled off and then the resulting product is purified by column chromatography on silica gel using $CH_2Cl_2$ as eluent and recrystallised from ethanol to give a pure product as a white solid (2 g, 23% yield).

Empirical formula: $C_{47}H_{64}O_6$, Molar mass: 725.01, Transition/T° C.: Cryst 84.3 N 138.7 Iso liq.

Step 6

1.8 g (2.42 mmol) of the compound obtained in Step 5 and 1.63 g (12 mmol) of 1,1,3,3-Tetramethyl-disiloxane are dissolved in 70 mL of dry toluene. Dry air bubbled through the solution for 2 min and few drops of platinium(0)-1,3-divinyl-1,1,3,3-tetramethyldisiloxane complex in xylene are added. After stirring at room temperature for 18 h with exclusion of moisture, the solvent is distilled off under reduced pressure. The residue purified by column chromatography on silica gel using a mixture of hexane/ethyl acetate (90/10) as eluent gives a pure white solid (1.74 g, 84% yield).

Empirical formula: $C_{51}H_{78}O_7Si_2$, Molar mass: 859.33, Transition/T° C.: Cryst 45.9 N 83.6 Iso liq.

Step 7

0.20 g (0.34 mmol) of the compound obtained in Step 1 of the synthesis of the compound 34 and 0.74 (0.68 mmol) of the molecule obtained in Step 6 are dissolved in 20 mL of dry toluene. Dry air bubbled through the solution for 2 min and few drops of platinium(0)-1,3-divinyl-1,1,3,3-tetramethyldisiloxane complex in xylene are added. After stirring at room temperature for 20 h with exclusion of moisture, the solvent is distilled off under reduced pressure. The residue purified by column chromatography on silica gel using a mixture of hexane/ethyl aetate (90/10) as eluent gives a pure oily product (0.62 g, 79%).

Empirical formula: $C_{133}H_{188}F_6O_{16}S_2Si_4$, Molar mass: 2333.34, Transition/T° C.: Tg 2.6 N 54.3 Iso liq.

Compound 38

To a stirred solution of 0.20 g (0.34 mmol) of the molecule obtained in Step 1 of the synthesis of the compound 34 and few drops of platinium(0)-1,3-divinyl-1,1,3,3-tetramethyldisiloxane complex in xylene in 40 mL of dry toluene is added dropwise a solution of 0.37 (0.34 mmol) of the molecule obtained in Step 6 of the synthesis of the compound 37 in 20 mL of dry toluene at room temperature. After stirring at room temperature for 20 h with exclusion of moisture, the solvent is distilled off under reduced pressure. The residue purified by column chromatography on silica gel using a mixture of hexane/ethyl acetate (90/10) as eluent gives a pure oily product (0.30 g, 61% yield).

Empirical formula: $C_{82}H_{110}F_6O_9S_2Si_2$, Molar mass: 1474.04, Transition/T° C.: Tg −10 N 15 Iso liq.

Compound 39

Step 1

4'-Undec-10-enyloxy-biphenyl-4-ol

A mixture of 10 g (0.053 mol) of 4,4'-Dihydroxy-biphenyl, 12.52 g (0.053 mol) of 11-Bromo-1-undecene, 7.42 g (0.053 mol) of $K_2CO_3$ and 120 mL of dry butanone is refluxed for 24 h, then the reaction mixture is allowed to return to room temperature. 100 mL of water is added, then the product is filtered off, washed with water and methanol. The resulting solid is recrystallised three times from butanone to give a pure white product (7.35 g, 41% yield).

Empirical formula: $C_{23}H_{30}O_2$, Molar mass: 338.48, Melting point: 135-136° C.

Step 2

4-(11-Bromo-undecyloxy)-4'-undec-10-enyloxy-biphenyl

A mixture of 2.80 g (8.68 mmol) of the compound obtained in Step 1, 8.18 g (26.0 mmol) of 1,11-Dibromo-undecane, 3.66 g ((26.0 mmol) of $K_2CO_3$ and 40 mL of dry butanone is refluxed for 24 h, then the reaction mixture is allowed to return to room temperature. The mixture is filtered and the solvent is distilled off under reduced pressure. The resulting crude is purified by column chromatography on silica gel using $CH_2Cl_2$ as eluent to give a pure white solid (9.11 g, 41% yield).

Empirical formula: $C_{34}H_{51}BrO_2$, Molar mass: 571.67, Melting point: 93-94° C.

Step 3

A mixture of 0.10 g (0.12 mmol) of the compound obtained in step 1 of the synthesis of the compound 23, 0.1 g (0.17 mmol) of the compound obtained in Step 3, 0.02 g (0.017 mmol) of $K_2CO_3$ and 15 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.12 g, 89% yield).

Empirical formula: $C_{81}H_{99}F_6NO_5S_2$, Molar mass: 1344.98, Melting point: 91-92° C.

Compound 40

A mixture of 0.15 g (0.30 mmol) of 1,2-Bis(6-hydroxy-2-methylbenzo[b]thiophen-3-yl)hexafluorocyclopentene obtained in Step 4 of the synthesis of the compound 9, 0.33 g (0.72 mmol) of the bromo compound, 0.10 g (0.72 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.26 g, 81% yield).

Empirical formula: $C_{85}H_{84}F_6N_2O_6S_2$, Molar mass: 1407.71, Transition/T° C.: Cryst 42.7 SmA 133.3 Iso liq Compound 41

A mixture of 0.15 g (0.27 mmol) of 1-(6-hydroxy-2-methylbenzo[b]thiophen-3-yl)-2-(6-undeceloxy-10-ene) hexafluorocyclopentene, 0.17 g (0.30 mmol) of the bromo compound, 0.10 g (0.72 mmol) of $K_2CO_3$ and 20 mL of dry butanone is refluxed for 24 h, then allowed to return to room temperature. The reaction mixture is filtered and the butanone is distilled off under reduced pressure. The crude product purified by column chromatography on silica gel using $CH_2Cl_2$ as eluent gives a pure product as a white solid (0.26 g, 85% yield).

Empirical formula: $C_{66}H_{71}F_6NO_4S_2$, Molar mass: 1120.40, Transition/T° C.: Cryst 24.9 SmA 60.01 Iso liq In the above experimental the following acronyms are used:

DIC is N,N'-diisopropylcarbodiimide.
DMAP is 4-Dimethylaminopyridine.
DIAD is Diidopropyl azocarboxylate.
LDA is Lithium diisopropylamine.

The following Tables show phase data for various compounds illustrative of the invention.

TABLE 1

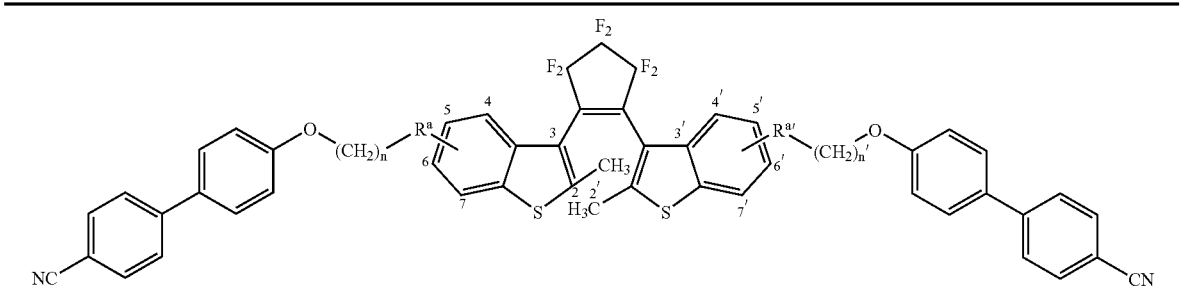

| | $R^a$ | $R^{a'}$ | n | n' | Cryst | SmX | SmA | N | Iso liq |
|---|---|---|---|---|---|---|---|---|---|
| 1 | $R^6$: COO | $R^{6'}$: COO | 2 | 2 | >350 | | | | |
| 2 | $R^6$: COO | $R^{6'}$: COO | 6 | 6 | | | | | |
| 3 | $R^6$: COO | $R^{6'}$: COO | 7 | 7 | 194.9 | (72.9) | | | |
| 4 | $R^6$: COO | $R^{6'}$: COO | 8 | 8 | | | | | |
| 5 | $R^6$: COO | $R^{6'}$: COO | 9 | 9 | 172.3 | (69.9) | | | |
| 6 | $R^6$: COO | $R^{6'}$: COO | 10 | 10 | 169.5 | (53.1) | | | |
| 7 | $R^6$: COO | $R^{6'}$: COO | 11 | 11 | 179.6 | (66.4) | | | |
| 8 | $R^6$: COO | $R^{6'}$: COO | 12 | 12 | 160.1 | (57.1) | | | |
| 9 | $R^6$: OCO | $R^{6'}$: OCO | 9 | 9 | | | 69.3 | 78.5 | |
| 10 | $R^6$: OCO | $R^{6'}$: OCO | 10 | 10 | | | 55.8 | 60.8 | |
| 11 | $R^5$: OCO | $R^{5'}$: OCO | 9 | 9 | 140.2 | | (92.0) | | |
| 12 | $R^5$: OCO | $R^{5'}$: OCO | 10 | 10 | 136.2 | (50.4) | (66.0) | | |
| 13 | $R^5$: OCO | $R^{6'}$: OCO | 9 | 9 | | | 74.3 | 87.8 | |
| 14 | $R^5$: OCO | $R^{6'}$: OCO | 10 | 10 | | | 56.9 | 65.6 | |
| 15 | $R^6$: O | $R^{6'}$: O | 6 | 6 | | | 78.9 | 95.5 | |
| 16 | $R^6$: O | $R^{6'}$: O | 10 | 10 | | | 73.6 | 77.5 | |
| 17 | $R^6$: O | $R^{6'}$: O | 11 | 11 | | | 57.7 | 61.4 | |
| 18 | $R^5$: O | $R^{5'}$: O | 10 | 10 | 141.3 | | (88.8) | | |
| 19 | $R^5$: O | $R^{5'}$: O | 11 | 11 | 120.5 | (51.3) | (61.7) | | |
| 20 | $R^5$: O | $R^{6'}$: O | 6 | 6 | | | | 113.2 | |
| 21 | $R^5$: O | $R^{6'}$: O | 10 | 10 | | | 56.9 | 66.6 | |
| 22 | $R^5$: O | $R^{6'}$: O | 11 | 11 | | | 52.7 | 61.1 | |
| 23 | $R^6$: O | $R^{6'}$: OCO | 11 | 10 | | | 57.8 | 62.1 | |
| 24 | $R^6$: O | $R^{6'}$: O | 6 | 11 | | | 53.5 | 61.9 | |

TABLES 2a, b, c
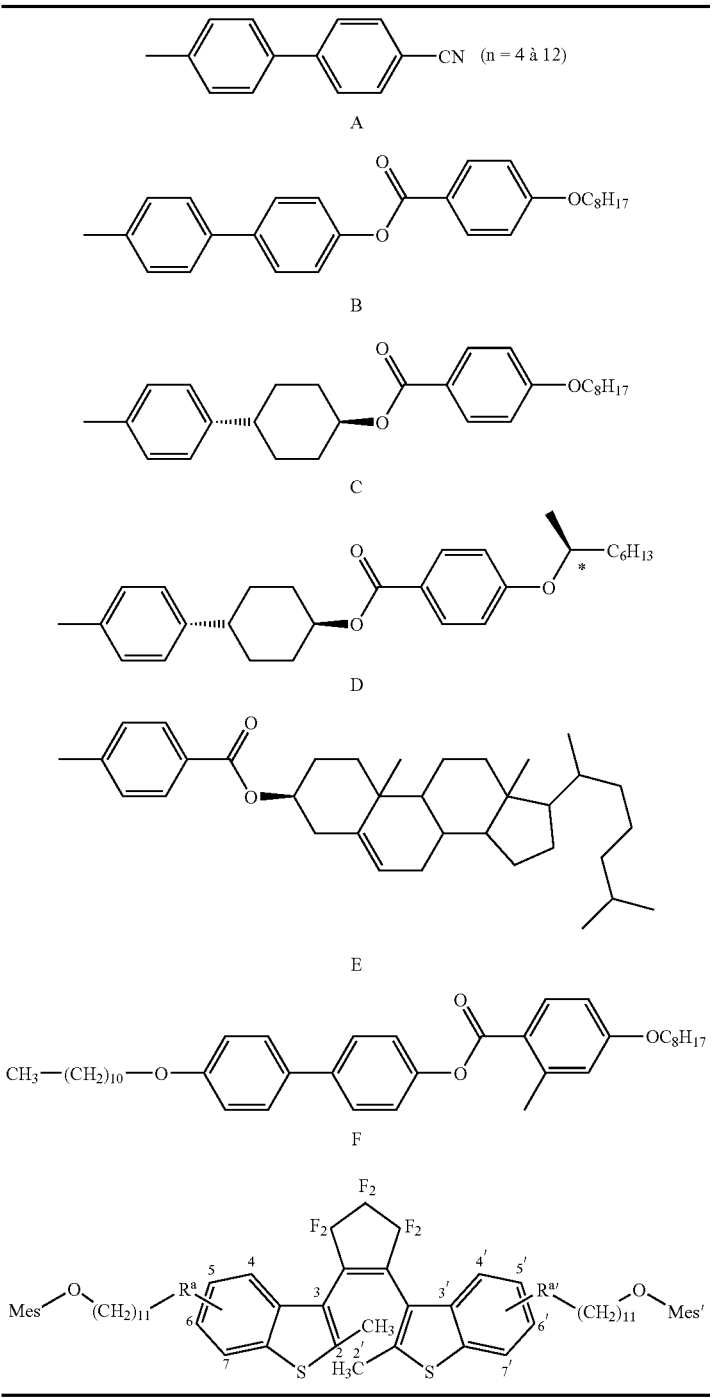
|    | Mes | Mes' | $R^a$ | $R^{a'}$ | Cryst | SmX | SmA | N | Iso lig |
|----|-----|------|-------|----------|-------|-----|-----|---|---------|
| 25 | B | B | $R^6$: O | $R^{6'}$: O |      | 87.9 | 161.4 |       |  |
| 26 | B | B | $R^5$: O | $R^{6'}$: O |      | 90.7 | 94.2  | 162.7 |  |
| 27 | C | C | $R^6$: O | $R^{6'}$: O | 89.1 |      | 121.9 |       |  |
| 28 | C | C | $R^5$: O | $R^{6'}$: O | 91.7 |      | 123.3 | 125.2 |  |
|    | Mes | Mes' | $R^a$ | $R^{a'}$ | Cryst | Tg | SmX* | SmA | Iso lig |
|----|-----|------|-------|----------|-------|----|------|-----|---------|
| 29 | D | D | $R^6$: O | $R^{6'}$: O | 72.1 | | (43.6) | (60.5) | |
| 30 | D | D | $R^5$: O | $R^{6'}$: O | 80.5 | | (45.8) | (62.6) | |

TABLES 2a, b, c-continued
| | | | | | | | |
|---|---|---|---|---|---|---|---|
| 31 | A | D | R⁵: O | R⁶: O | 25.3 | 66.2 | |
| | Mes | Mes' | Rᵃ | Rᵃ' | Cryst | Tg | SmX* | N* | Iso liq |
|---|---|---|---|---|---|---|---|---|---|
| 32 | E | E | R⁶: O | R⁶': O | | 61.8 | 175.4 | | |
| 33 | E | E | R⁵: O | R⁶': O | | 62.2 | 174.1 | 183.1 | |
TABLE 3
Mes—O—(CH₂)₅—Si—O—Si—(CH₂)₄—[mesogen with benzothiophene-cyclopentane-F units]—(CH₂)₄—Si—O—Si—(CH₂)₅—O—Mes'
| | Mes | Mes' | Rᵃ | Rᵃ' | Cryst | Tg | SmX | SmA | N | Iso liq |
|---|---|---|---|---|---|---|---|---|---|---|
| 34 | A | A | R⁶: O | R⁶': O | / | | / | / | / | / |
| 35 | F | F | R⁶: O | R⁶': O | | −14.3 | | | 10.7 | |
TABLE 4
| | Cryst | SmX | SmA | N | Iso liq |
|---|---|---|---|---|---|
| 36 | 139.8 | | | (96.7) | |
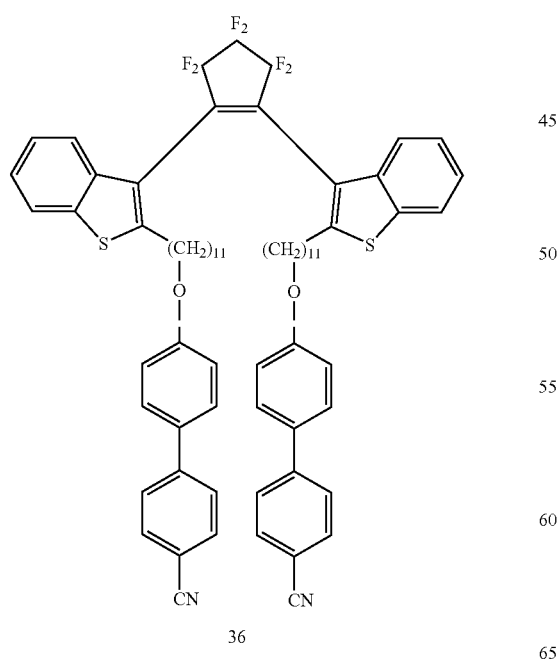
36

TABLE 5

| | Cryst | Tg | SmX | SmA | N | Iso lig |
|---|---|---|---|---|---|---|
| 37 | | 2.6 | | | 54.3 | |
| 38 | | −10.4 | | | 15.0 | |
| 39 | 91.8 | | | | | |
| 40 | 42.6 | | | 133.3 | | |
| 41 | 24.8 | | | 60.0 | | |

TABLE 5-continued
| Cryst | Tg | SmX | SmA | N | Iso lig |
|-------|----|----|-----|---|---------|
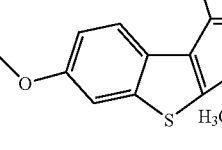
38
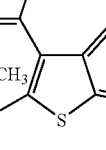
39
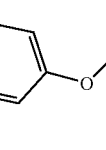

TABLE 5-continued

| | Cryst | Tg | SmX | SmA | N | Iso lig |
|---|---|---|---|---|---|---|

40

41

An example of the use of a material and device embodying the present invention will now be described with reference to FIG. 11.

FIG. 11 is a representation of a liquid crystal device which consists of two transparent plates, 1 and 2, for example made from glass or a polymer. These plates are coated on their internal face with transparent conducting electrodes 3 and 4. An alignment layer 5,6, eg made from polyimide, is introduced onto the internal faces of the cell so that a planar orientation of the molecules making up the liquid crystalline material will be approximately parallel to the glass plates 1 and 2. This is done by coating the glass plates 1,2 complete with conducting electrodes so that the intersections between each column and row form an x, y matrix of addressable elements or pixels. For some types of display the alignment directions are orthogonal. Prior to the construction of the cell the layers 5,6 are rubbed with a roller covered in cloth (for example made from velvet) in a given direction, the rubbing directions being arranged parallel (same or opposite direction) upon construction of the cell. A spacer 7 e.g. of polymethyl methacrylate separates the glass' plates 1 and 2 to a suitable distance e.g. 2 microns. Liquid crystal material 8 is introduced between glass plates 1,2 by filling the space in between them. This may be done by flow filling the cell using standard techniques. The spacer 7 is sealed with an adhesive 9 in a vacuum using an existing technique. Polarisers 10, 11 may be arranged in front of and behind the cell.

Alignment layers may be introduced onto one or more of the cell walls by one or more of the standard surface treatment techniques such as rubbing, oblique evaporation or by the use of polymer aligning layers.

The device may operate in a transmissive or reflective mode. In the former, light passing through the device, e.g. from a tungsten bulb, is selectively transmitted or blocked to form the desired display. In the reflective mode a mirror, or diffuse reflector, (12) is placed behind the second polariser 11 to reflect ambient light back through the cell and two polarisers. By making the mirror partly reflecting the device may be operated both in a transmissive and reflective mode.

In an alternative embodiment a single polariser and dye material may be combined. The alignment layers 5,6 have two functions, one to align contacting liquid crystal molecules in a preferred direction and the other to give a tilt to these molecules—a so called surface tilt—of a few degrees typically around 4° or 5°. The alignment layers 5,6 may be formed by placing a few drops of the polyimide on to the cell wall and spinning the wall until a uniform thickness is obtained. The polyimide is then cured by heating to a predetermined temperature for a predetermined time followed by unidirectional rubbing with a roller coated with a nylon cloth.

The devices described by the current invention may or may not be multiplex addressed.

In the above description of a typical LCD the materials of the present invention may provide a variety of roles including one or both of the following:

They may comprise the liquid crystal material 8

They may be comprised in the alignment layers 5 and 6.

When a part of the alignment layers then the materials may provide the functions of alignment and contributing to the bulk properties of the liquid crystal material in the sense that they may be photochemically modified thus affecting the transmission of plane polarised light through the device. The device may be optically eg light addressed or it may be appropriate to have a combination of both electrical and light addressing means. When the device is solely light addressed the electrode structures 3 and 4 are not necessary.

Use of optical addressing means allows for the provision of smaller pixels which in turn gives rise to devices which are able to take advantage of the miniaturisation of associated components. 3-D displays are examples of such devices.

FIGS. 12 to 16 show examples of the modulation of the absorption behaviour of the materials of the invention on irradiation in a manner which is characteristic of the behaviour of photochromic materials, ie the maxima show that the closed form is highly coloured while the open form is not.

Photochemical measurements were obtained as follows:

Absorption spectra were performed in cyclohexane solutions of spectrometric grade (Fisher Chemicals) at 25° C. (to ±0.2° C.). The analysis cell (optical pathlengh 10 nm) was placed in a thermostated copper block inside the sample chamber of a Cary 50-diode array spectrophotometer. An Oriel 200 W high pressure Hg/Xe lamp was used for irradiation. Mercury lines of 313 and 546 nm were isolated by passing through a monochromater (Oriel).

Conversion Measurements:

The open- and the closed-ring isomers were separated by HPLC using a Merck-Hitachi system fitted with a Rainin Dynamax Microsorb 5 μm silica column (25 cm long, 4.6 mm internal diameter) and using hexane as eluent or a mixture of hexane/ethyl acetate depending on the chemical structure of the compound.

Figure 12:
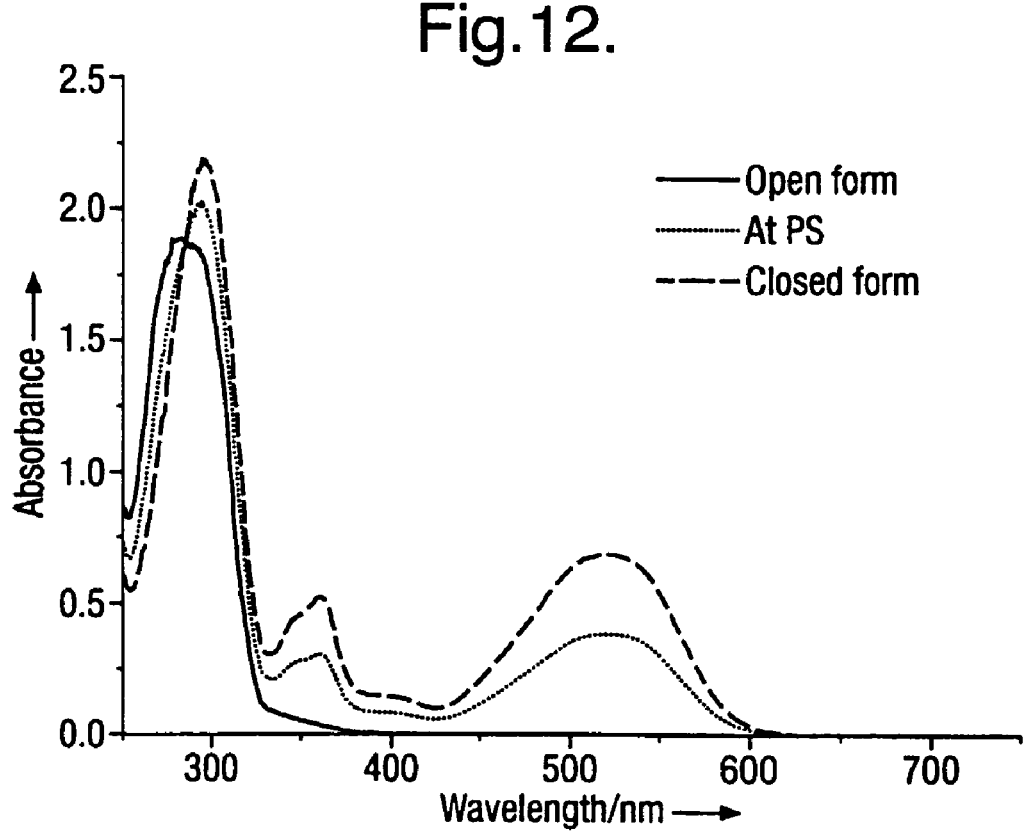

The following data were obtained for the respective compounds:

FIG. 12; Compound 16
Initial State: Cr 40.1 SmC 74.5 N 78.5 Iso
Final State: Tg 26.5 SmX 54.6 N 75.9 Iso
The conversion at the Photostationary State is of 56%.

Figure 13:
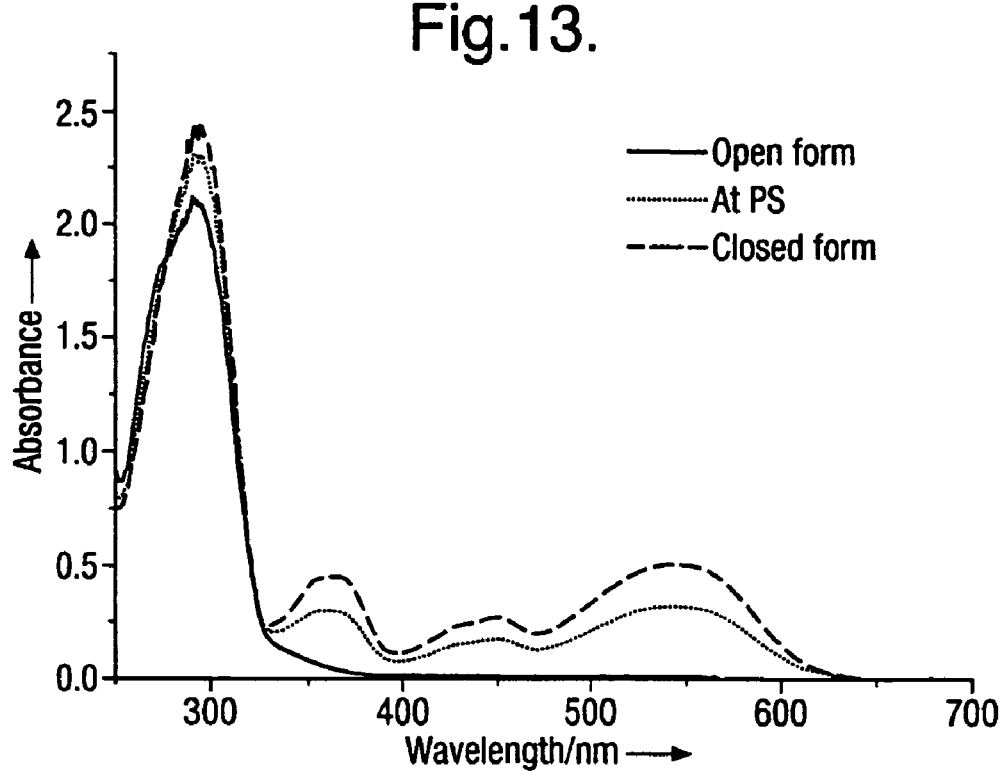

FIG. 13; Compound 21
Initial State: Cr 45.4 SmC 79.5 N 92.1 Iso
Final State: Tg 31.8 SmX 92.6 Iso
The conversion at the Photostationary State is of 63%.

Figure 14:
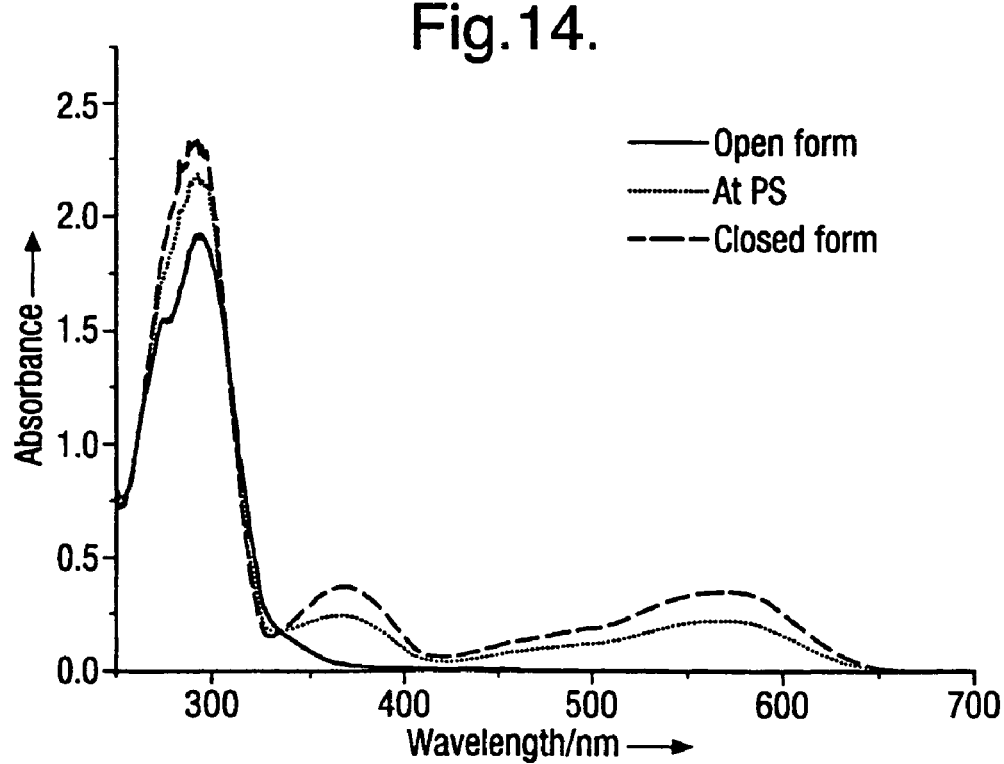

FIG. 14; Compound 18
Initial State: Cr 141.3 (N 88.8)
Final State: Cr 121.9 (SmX 63.5)
The conversion at the Photostationary State is of 64%.

Figure 15:
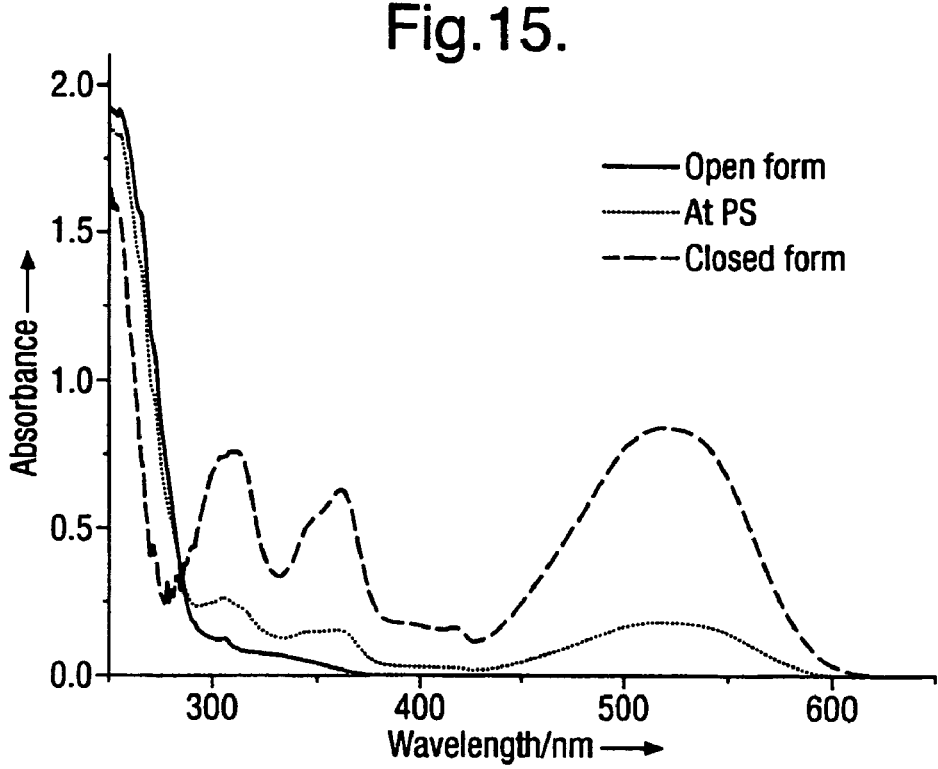

FIG. 15; Compound 32
Initial State: Cr 61.8 SmA 175.4 Iso
Final State: Tg 46.7 SmA 160.6 Iso
The conversion at the Photostationary State is of 24%.

Figure 16:
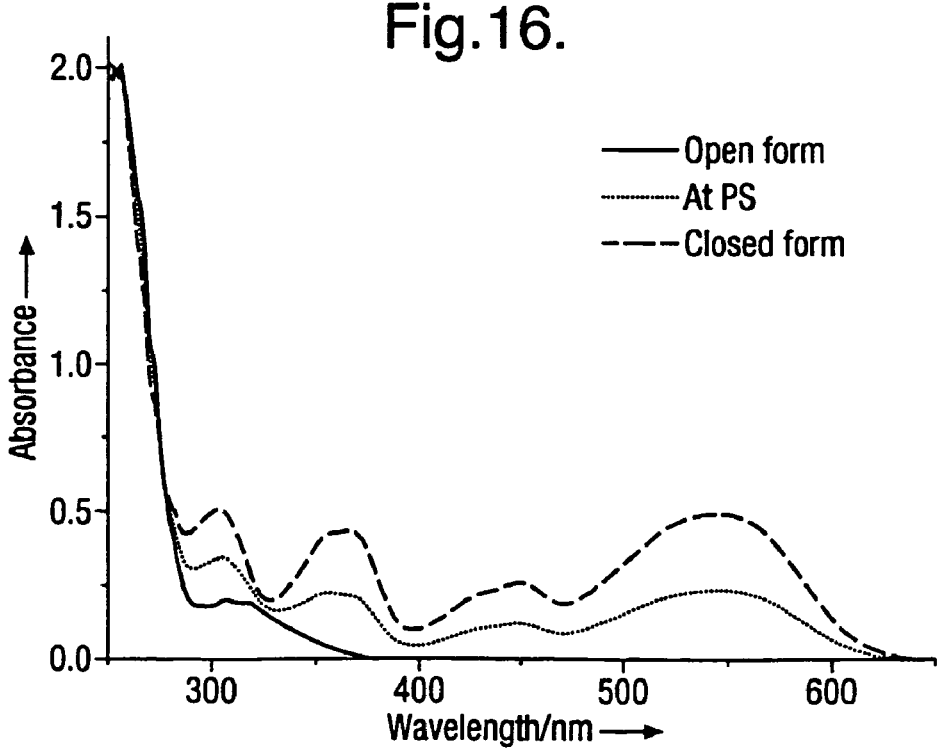

FIG. 16; Compound 33
Initial State: Cr 62.1 SmA 162.4 N* 183.1 Iso
Final State: Tg 52.3 SmA 162.4 N 180.0 Iso
The conversion at the Photostationary State is of 49%.

The modulations demonstrated may be taken as being indicative of the ways in which the respective materials can be used in a device.

The materials of Formula I/Ib can be used in optically addressed memory devices (optical storage). The material is switched between the 2 states I and Ib (or vice versa). The state of the material at any spatial point may then be read by either using light of a wavelength which does not alter the state of the material (read many times) or by using a light which does alter the state of the material (read once). Multiple write/read/erase cycles are possible. The read light may be linearly, circularly or elliptically polarised. In a particular embodiment of this application the write light is circularly polarised and the material is switched between I and Ib such that a chiral transformation is effected.

The materials of the present invention may be tethered to the surface of the substrates 1 and 2 and/or this may be via an electrode and/or optionally an alignment layer. This may be achieved by the use of a spacer group attached to the photochromic moiety. This is particularly applicable to those compounds which comprise the Si—O—Si groups. Short polymeric systems may be used which possess a terminal functional group such as an aldehyde or a double bond. Irradiation may then be used to link the group to the surface of the substrate. The group $R^9$ may serve as a point of attachment when it possesses one or more alkene groups, particularly when there is an alkene group in the terminal position, this is also the case for the group $Z^5$ in Formula III.

The materials of the present invention may be coated on to the substrate surface by conventional techniques including dipping techniques or by spincoating.

Suitable light addressing techniques include the use of lasers.

Further applications for the materials of the present invention include in piezoelectics—including reversible piezoelectrics and in artificial muscles or photo-addressable actuators.

There are numerous other applications in which the materials of the present invention may be advantageously used including in the fields of: molecular logical gates see K. L Kompa, R. D. Levine, PNAS, 98, 410 (2001); liquid crystalline photoresponsive dyes; liquid crystalline photoresponsive lase dyes; image sensing and sensor protection; ultrafast colour displays and in mesomorphic molecular switches in conducting materials.

The invention claimed is:

1. A material given by Formula I and Ib:

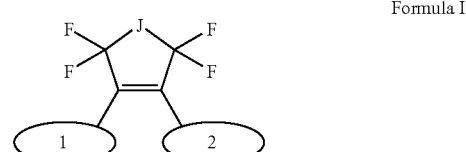

Formula I

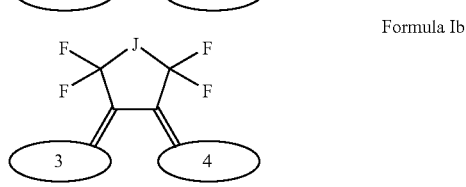

Formula Ib

Wherein the 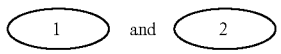
groups are chosen respectively from the following:
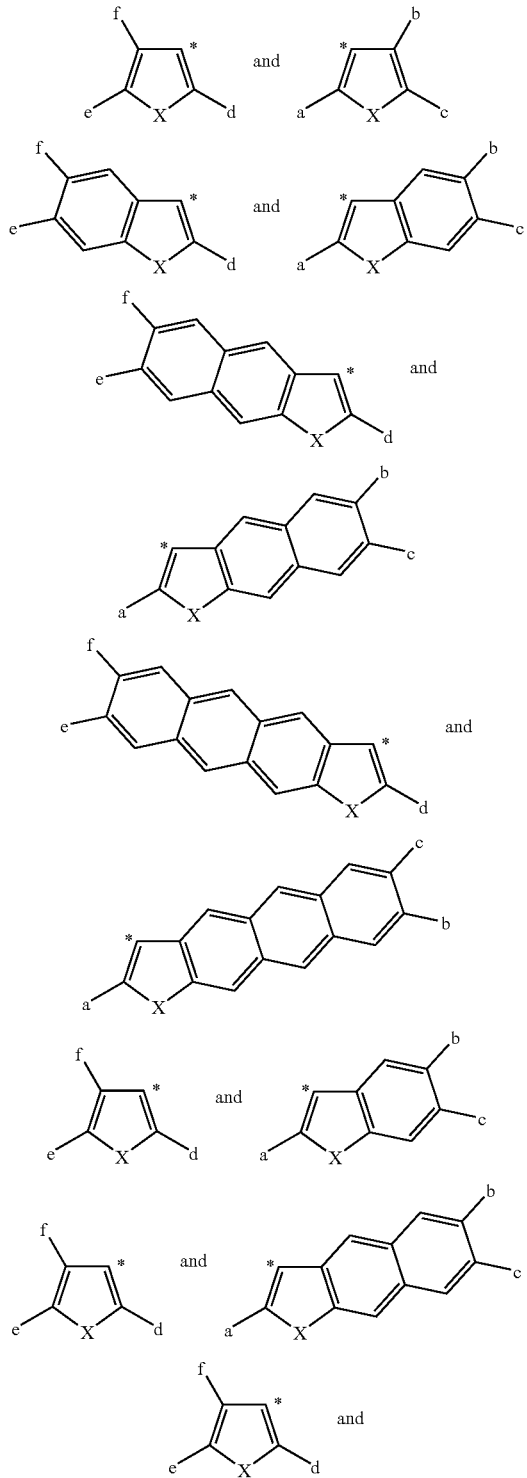
-continued
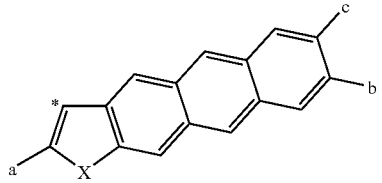
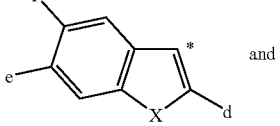
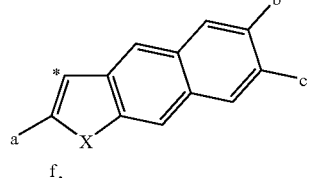
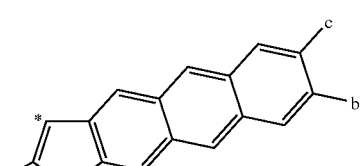
wherein 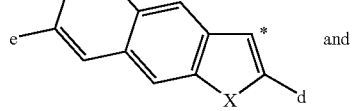
are together chosen from:
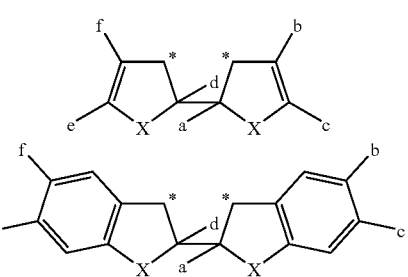

-continued

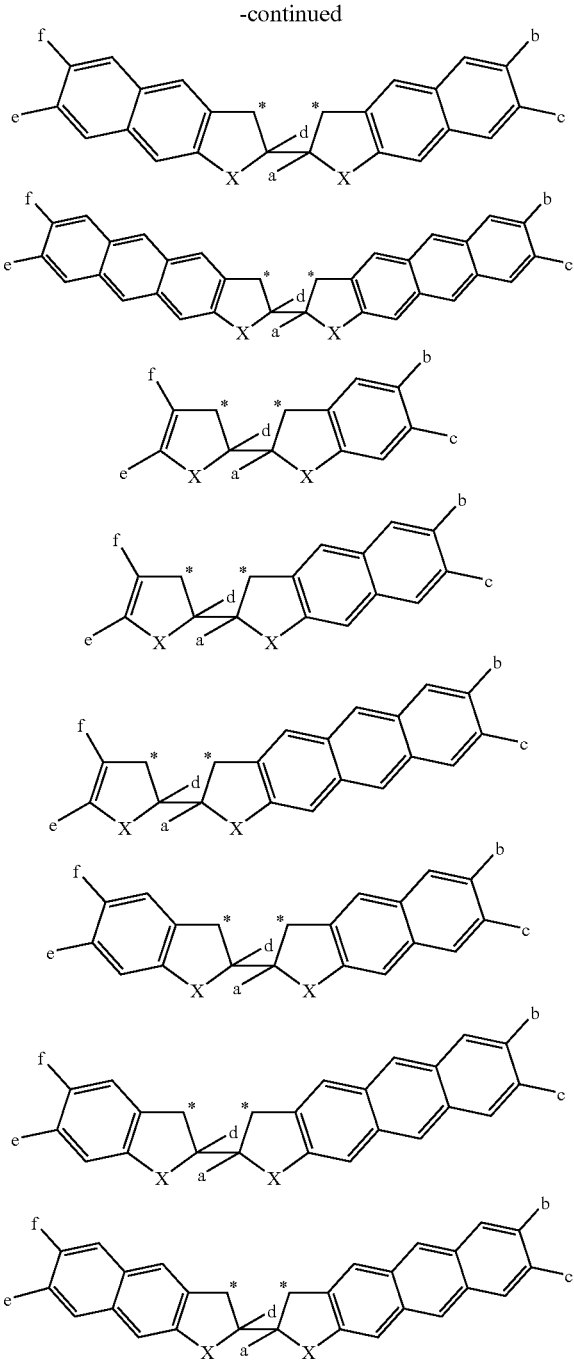

* indicates the point of attachment to Formula I or Formula Ib;
the phenyl groups in

may independently of each other be replaced by pyridine and pyrimidine groups;
wherein X is selected from S, O, NH, Se, CH$_2$, P;
wherein J is selected from CF$_2$, CH$_2$, CFH, NR$^9$ wherein R9 is selected from H, C1-40 branched or straight chain alkyl wherein one or more of the CH$_2$ groups may be replaced by O, CH and the terminal CH$_3$ group may be replaced by a CH$_2$ group or an SH, OH, COOH, CHO, O$_2$CCHCH$_2$ or O$_2$CC(CH$_3$)CH$_2$ group;
wherein a and d are independently selected from CH$_3$, CF$_3$, CH$_2$CH$_3$, OCH$_3$, OCH$_2$CH$_3$ or Formula II;
b, c, e and f are independently selected from H, Formula II or C1-40 branched or straight chain alkyl wherein one or more of the CH$_2$ groups may be replaced by O, CFH, CF$_2$, CH and the terminal CH$_3$ group may be replaced by a CH$_2$ group or an SH, OH, CF$_3$, COOH, CHO, O$_2$CCHCH$_2$ or O$_2$CC(CH$_3$)CH$_2$ group
wherein Formula II is given by:

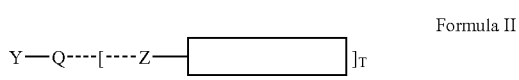

Formula II wherein Y is selected from O, —CO$_2$—, O$_2$C, S, CH$_2$, or a single bond;
Q is selected from (CH$_2$)n, n is 1-20 or (CH$_2$)m-[Si(L2)-O]q-Si(L2)-(CH$_2$)p- where m is 2-20, p is 2-20, q is 1-12 and the L groups are independently of each other selected from CH$_3$, CF$_3$, H;
Z is O or CO$_2$ or O$_2$C or CH$_2$ or a single bond;

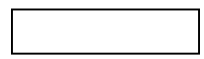

is a mesogenic group;
T is 1 or 2 or 3;
when T is 2 then Q may also be selected from (CH$_2$)gN((CH$_2$)r)$_2$, (CH$_2$)gSi(CH$_3$)((CH$_2$)r)$_2$, (CH$_2$)gP((CH$_2$)r)$_2$, (CH$_2$)gGe(CH$_3$)((CH$_2$)r)$_2$, wherein the values of g and r are independently selected from 1-20;
when T is 3 then Q may also be selected from (CH$_2$)g'Si((CH$_2$)r')$_3$, and (CH$_2$)g'Ge((CH$_2$)r')$_3$;
wherein the values of g' and r' are independently selected from 1-20;
provided that at least one of a, b, c, d, e, f are selected from Formula II.

2. A material according to claim 1 wherein the mesogenic group is given by Formula III:

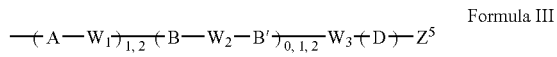

Formula III

A, B, B' D are selected from the following rings:

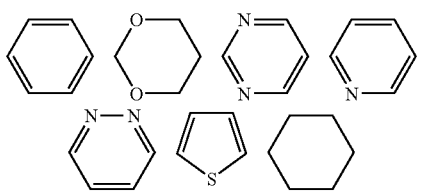

the above rings may be substituted with one or more of the following substituents in at least one of the available substitution positions: F, Cl, Br, CH$_3$, CN, OR, R and NCS where R is given by $C_{1-16}$ branched or straight chain alkyl; B' may also be selected from single bond;

$Z^5$ is selected from CN, F, Cl, $NO_2$, R, OR, $CO_2R$, $CF_3$, OOCR, NCS, SCN, where R=straight chain or branched chain alkyl and may include from 1-16 carbon atoms and including where one or more non-adjacent $CH_2$ groups may be substituted by CH(CN), $CH(CF_3)$, CH(Cl), $CH(CH_3)$ in chiral or non-chiral form and one or more non-adjacent $CH_2$ groups may be substituted by CH such that there is a double bond present and the terminal $CH_3$ group may be replaced by a $CH_2$ group;

provided that the total number of rings present is not greater than 4;

$W_1$ and $W_2$ and $W_3$ are independently selected from COO, OCO, single bond, $CH_2CH_2$, $CH_2O$, $OCH_2$, O, S, CH=CH, C≡C, $OCO(CH_2)_x$, $COO(CH_2)_x$ wherein $x$ is 1-4.

3. A material according to claim 1 wherein the mesogenic group or at least a part of the mesogenic group is given by the cholesteryl group or a derivative of the cholesteryl group.

4. A material according to claim 1 wherein the core of the mesogenic group is chosen from the following:

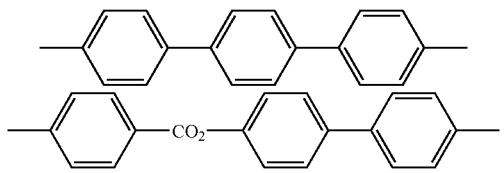

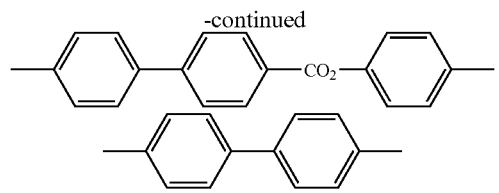
-continued wherein in each of the mesogenic groups, one or two or three of the phenyl rings may be, independently of each other, replaced by cyclohexyl, pyrimidine or pyridine and the cyclohexyl groups and phenyl groups may independently of each other be substituted in one or two or three positions with F, the $CO_2$ group may also be replaced with $O_2C$ or C≡C.

5. A liquid crystal mixture comprising at least one compound of claim 1.

6. An electro-optic device comprising at least one compound of claim 1.

7. An electro-optic device comprising a mixture as defined in claim 5.

8. A device according to claim 6 wherein the electro-optic device is a liquid crystal device.

9. A device according to claim 7 wherein the electro-optic device is a liquid crystal device.

10. A device according to claim 6 which is multiplex addressed or is addressed by light.

11. A device according to claim 7 which is multiplex addressed or is addressed by light.

* * * * *